United States Patent [19]

Moses et al.

[11] Patent Number: 4,724,435
[45] Date of Patent: Feb. 9, 1988

[54] BI-DIRECTIONAL DATA TELEMETRY SYSTEM

[75] Inventors: Donald W. Moses; Robert Moses; James W. Kinne, all of Minneapolis, Minn.; Charles H. Hustig, Hudson; Wayne P. Olson, River Falls, both of Wis.; Alan M. Doberstein, Braham, Minn.; Robert S. Bradford, Woodland Hills, Calif.

[73] Assignee: Applied Spectrum Technologies, Inc., Minneapolis, Minn.

[21] Appl. No.: 796,052

[22] Filed: Nov. 6, 1985

[51] Int. Cl.⁴ .................... H04Q 11/00; G08C 15/08
[52] U.S. Cl. ............................. 340/870.130; 379/106; 370/54; 375/1
[58] Field of Search ............. 340/870.13, 870.03; 179/2 AM, 5 R; 370/54, 58, 69.1, 27, 120, 112, 42, 18, 32.1; 375/1, 27; 379/106-109

[56] References Cited

U.S. PATENT DOCUMENTS

| | | | |
|---|---|---|---|
| 4,228,424 | 10/1980 | Lenay et al. | 179/5 R |
| 4,332,980 | 6/1982 | Reynolds et al. | 179/2 AM |
| 4,425,642 | 1/1984 | Moses et al. | 370/76 |
| 4,425,661 | 1/1984 | Moses et al. | 375/1 |
| 4,475,208 | 10/1984 | Ricketts | 375/1 |
| 4,504,831 | 3/1985 | Jahr et al. | 179/2 AM |
| 4,531,211 | 7/1985 | Hadziomerovic | 370/112 |
| 4,578,536 | 3/1986 | Oliver et al. | 179/2 AM |
| 4,602,362 | 7/1986 | Hargrave et al. | 370/54 |
| 4,672,605 | 6/1987 | Hustig et al. | 375/1 |

OTHER PUBLICATIONS

Nation Semiconductor, LM 1893 Carrier-Current Transceiver, Apr. 1, 1983 (16 pages).
"Time-Compression Multiplexing: Squeezing Digits Through Loops", Barry S. Bosik, *AT&T Bell Laboratories Record*, Feb. 1984, pp. 21-25.
"Data-Voice Multiplexer Technologies for Packet Switched Networks", Robert E. Buss, Jr. et al., *Telphony*, Jun. 9, 1986, pp. 56, 60, 64, 68.

*Primary Examiner*—Donald J. Yusko
*Attorney, Agent, or Firm*—Dorsey & Whitney

[57] ABSTRACT

The data telemetry system disclosed is a complete data communications systems suitable for use by utilities such as electric companies, gas companies and water companies which can be used for meter reading and load management at individual subscribers premises. Elements of the system can also be used as a power load carrier in a premise specific local area network (LAN). With the system is disclosed, all 10,000 subscribers per exchange can be serviced. It will be understood that data can be multiplexed between a central office location and remote subscribers for any suitable purpose with the data system as disclosed. A packet switching structure is disclosed having eight to thirty-two bytes in the data message. This packet is routed between the utility and remote subscriber with routing headers being added and deleted as required by the network modules. Each successive layer of the multiplexing and switching hierarchy submultiplies the aggregate 10,000 channel capacity into fewer channels. Both time and space division switching and multiplexing are used.

14 Claims, 15 Drawing Figures

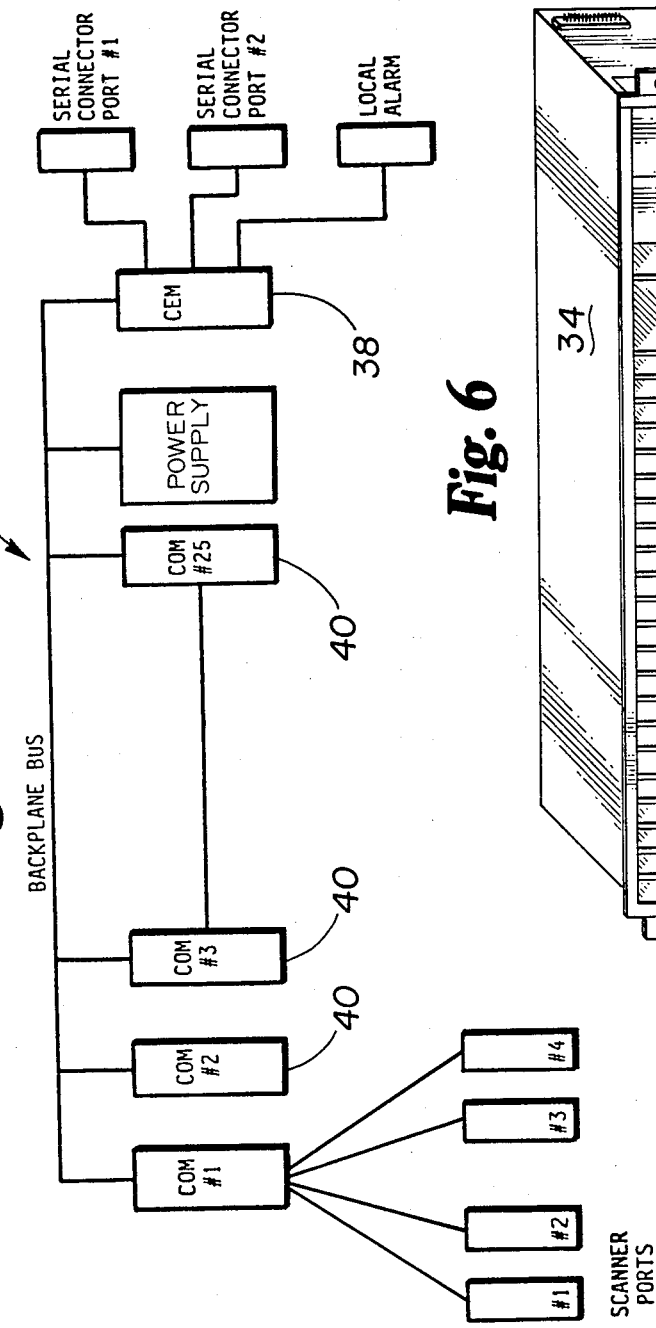
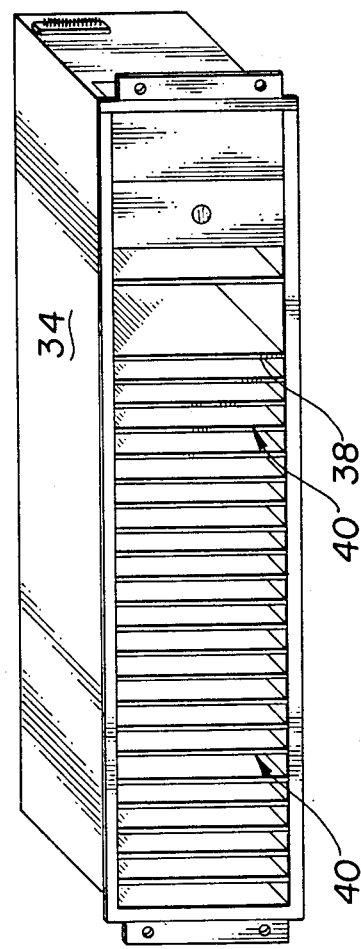

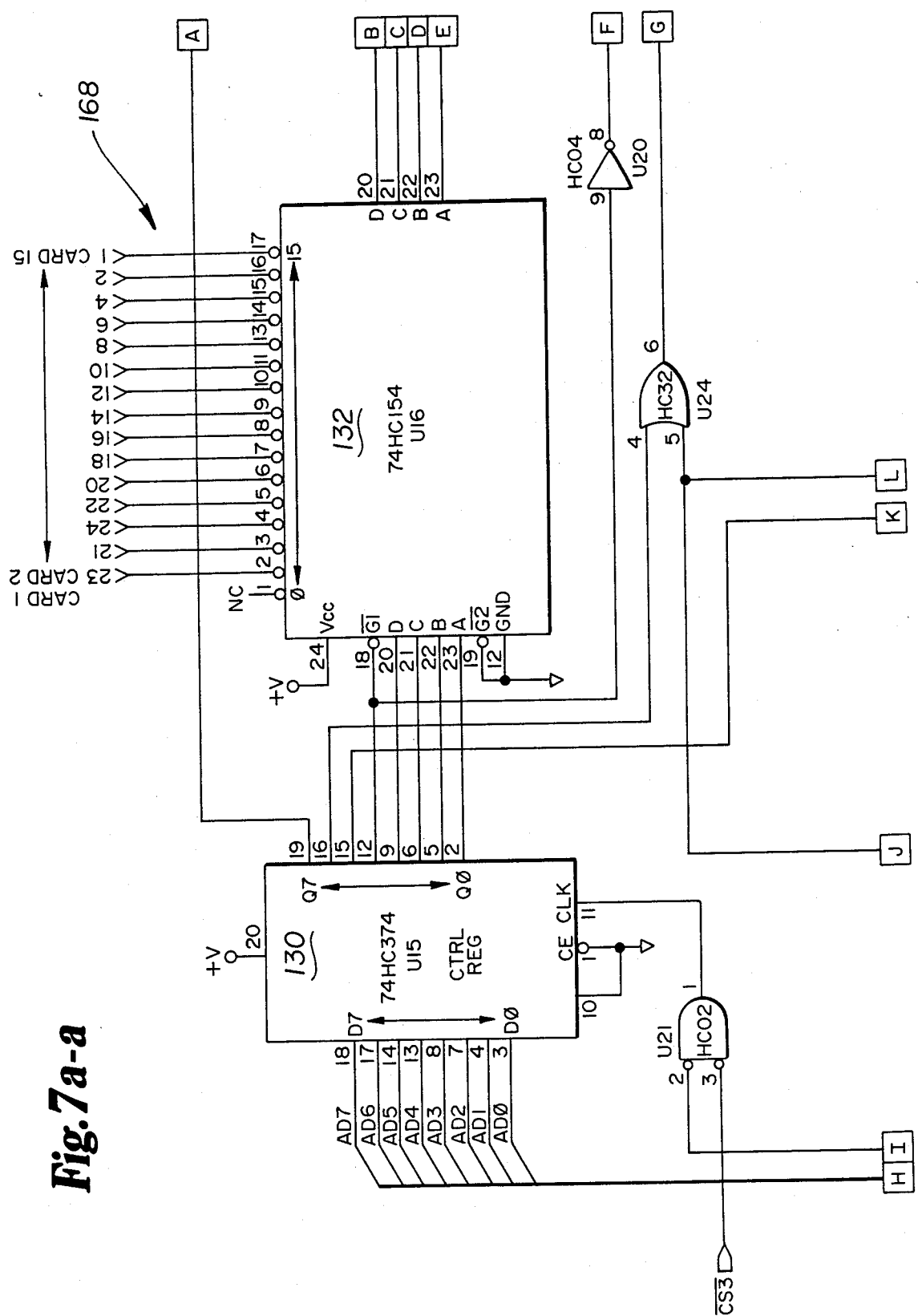
Fig.7a-a

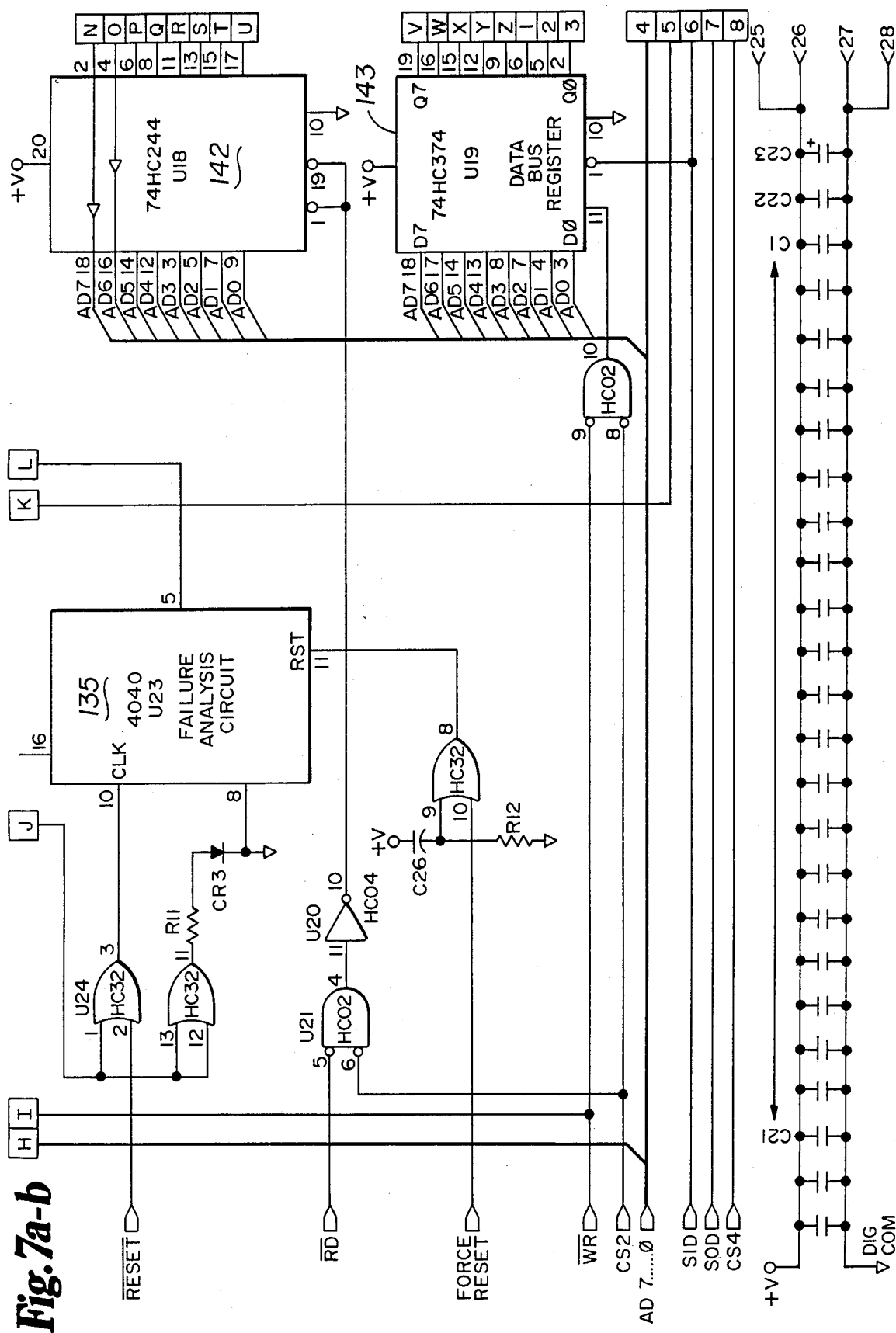
Fig. 7a-b

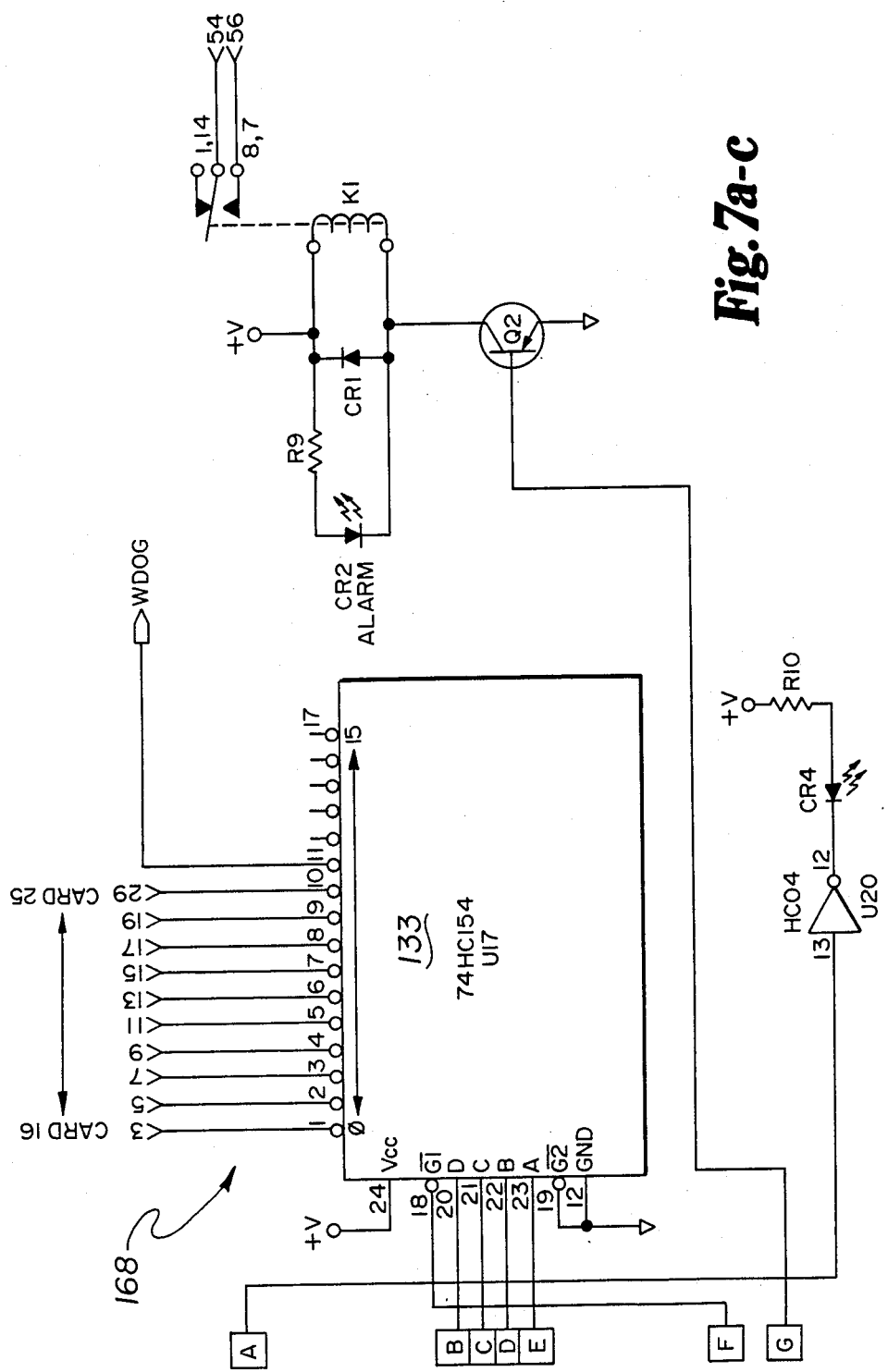

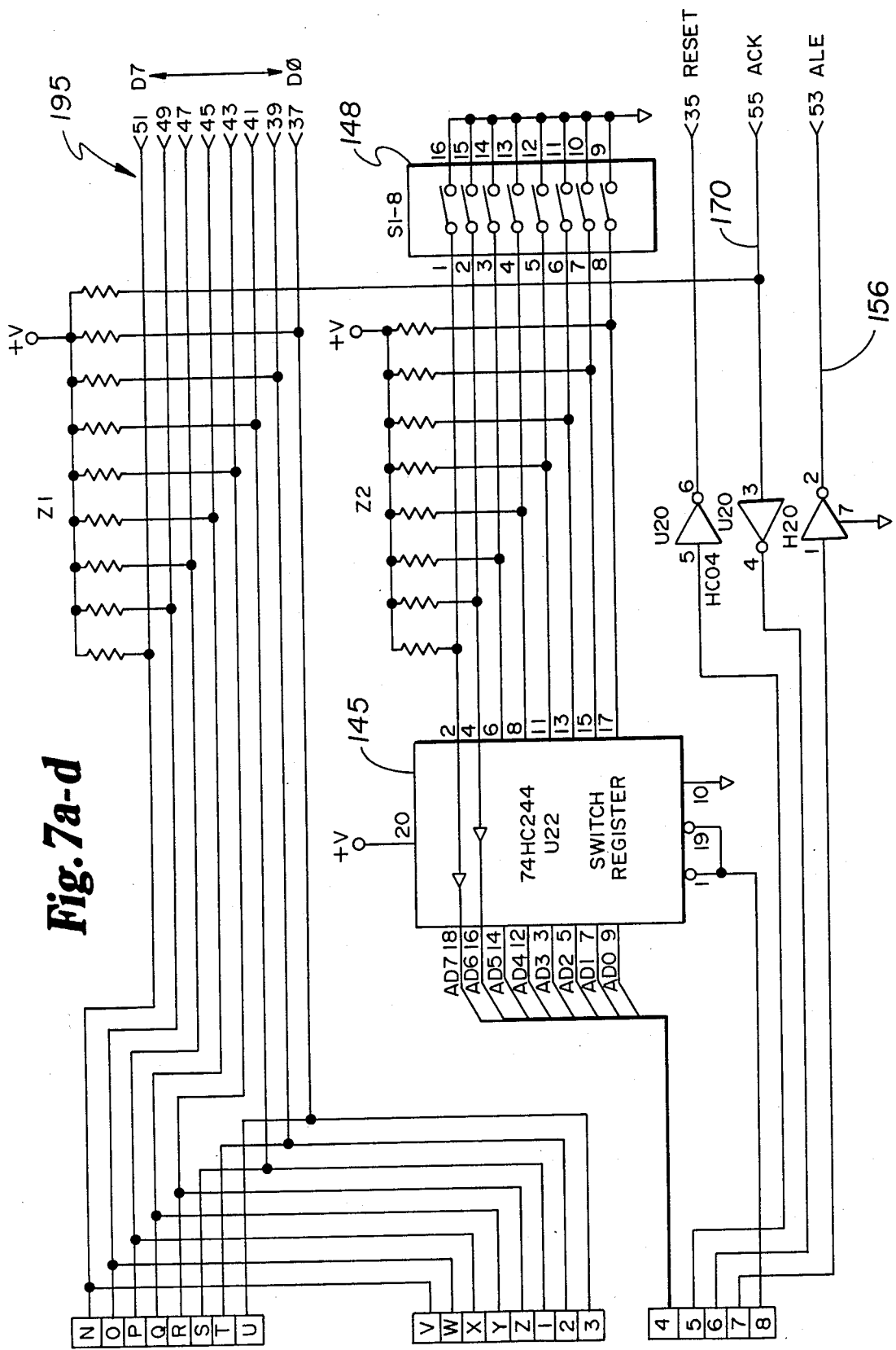
Fig. 7a-d

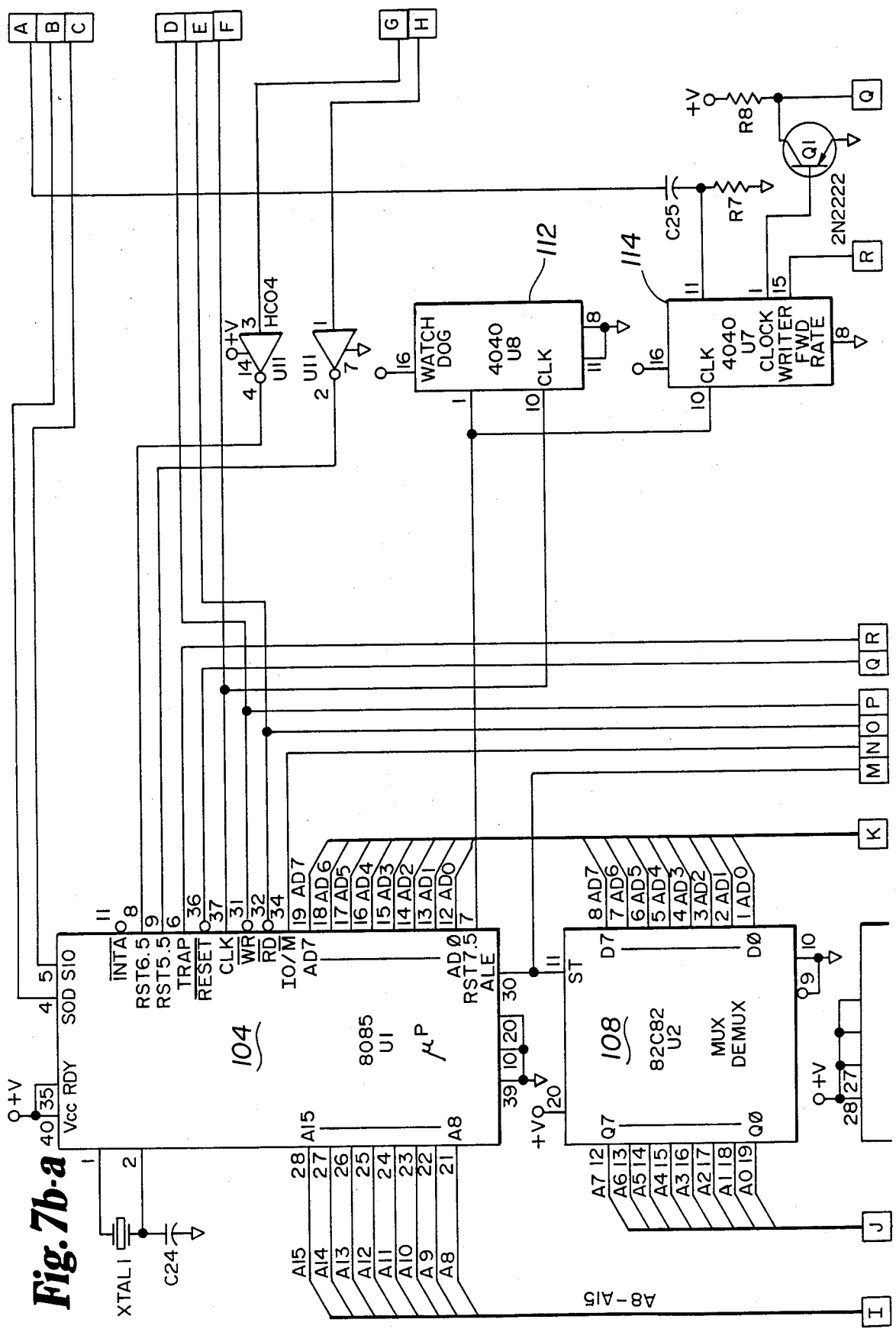
Fig. 7b-a

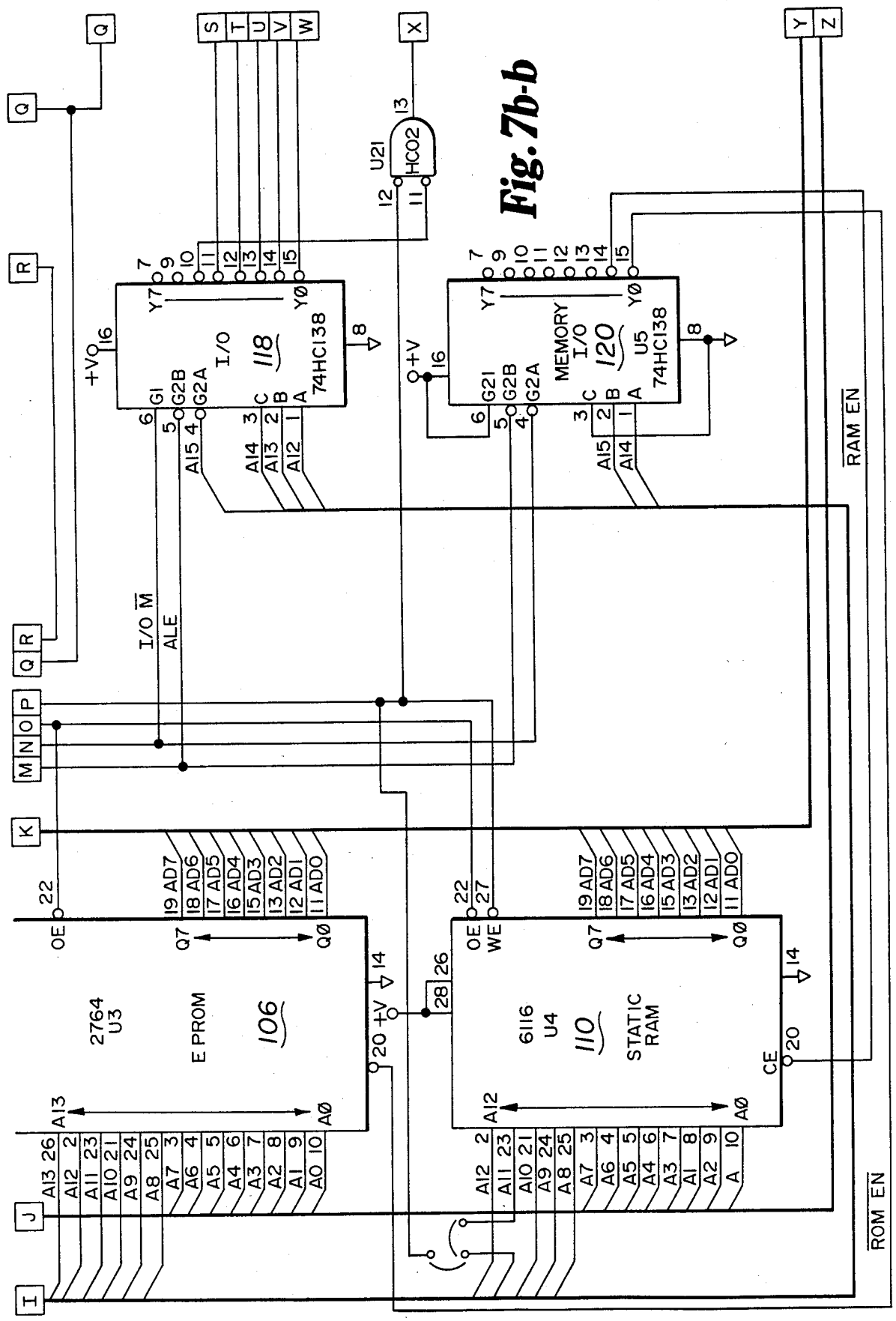
Fig. 7b-b

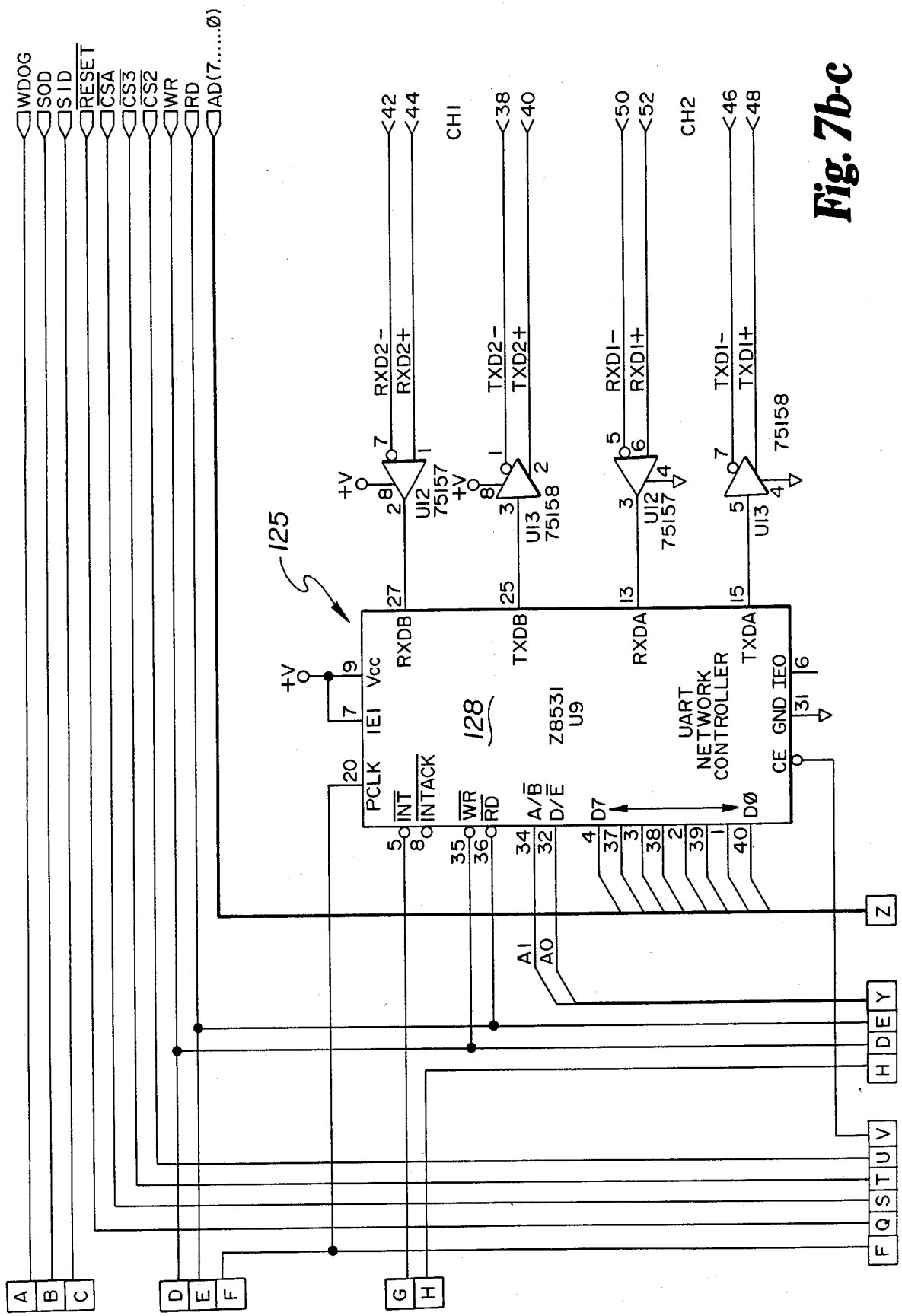
Fig. 7b-c

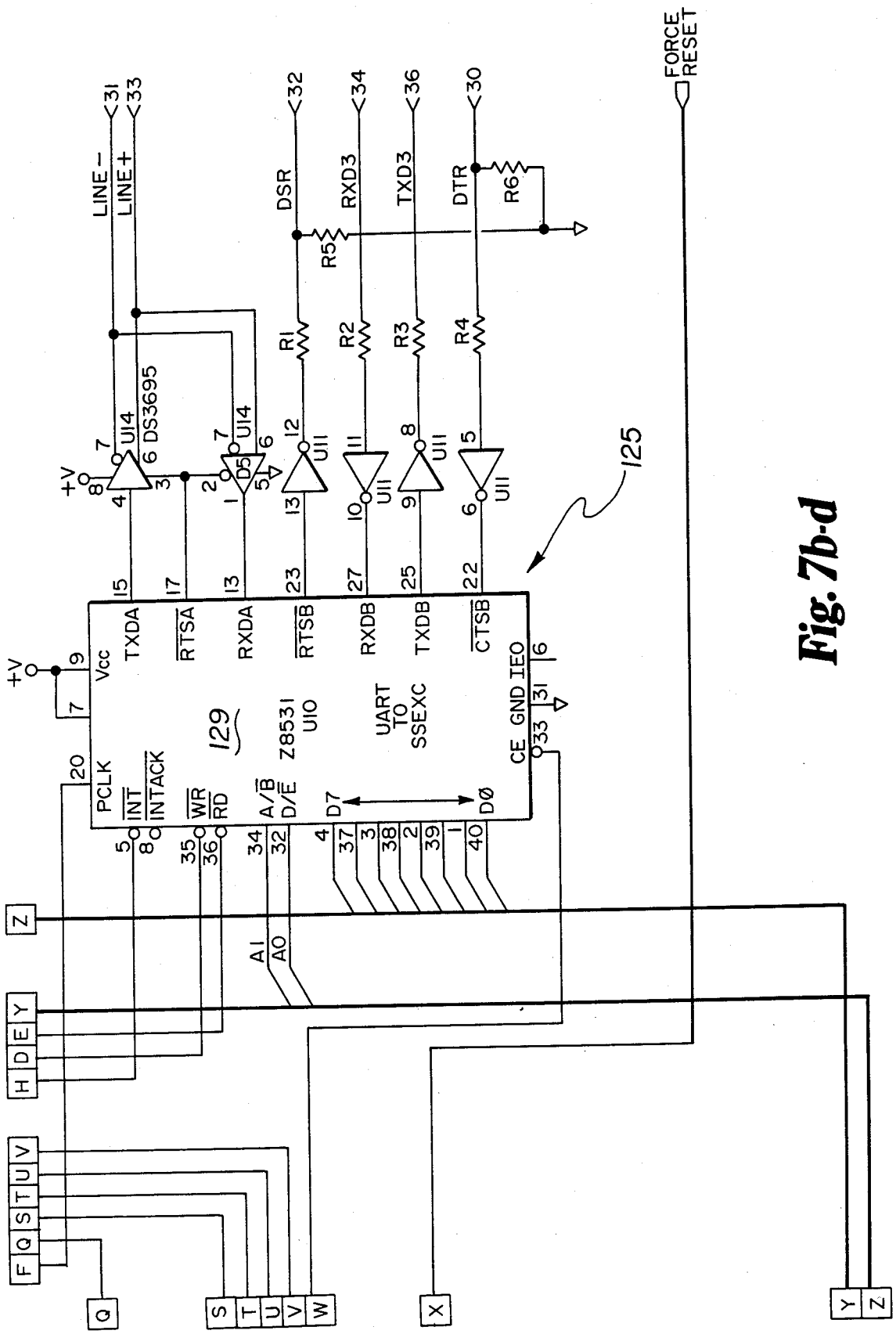
Fig. 7b-d

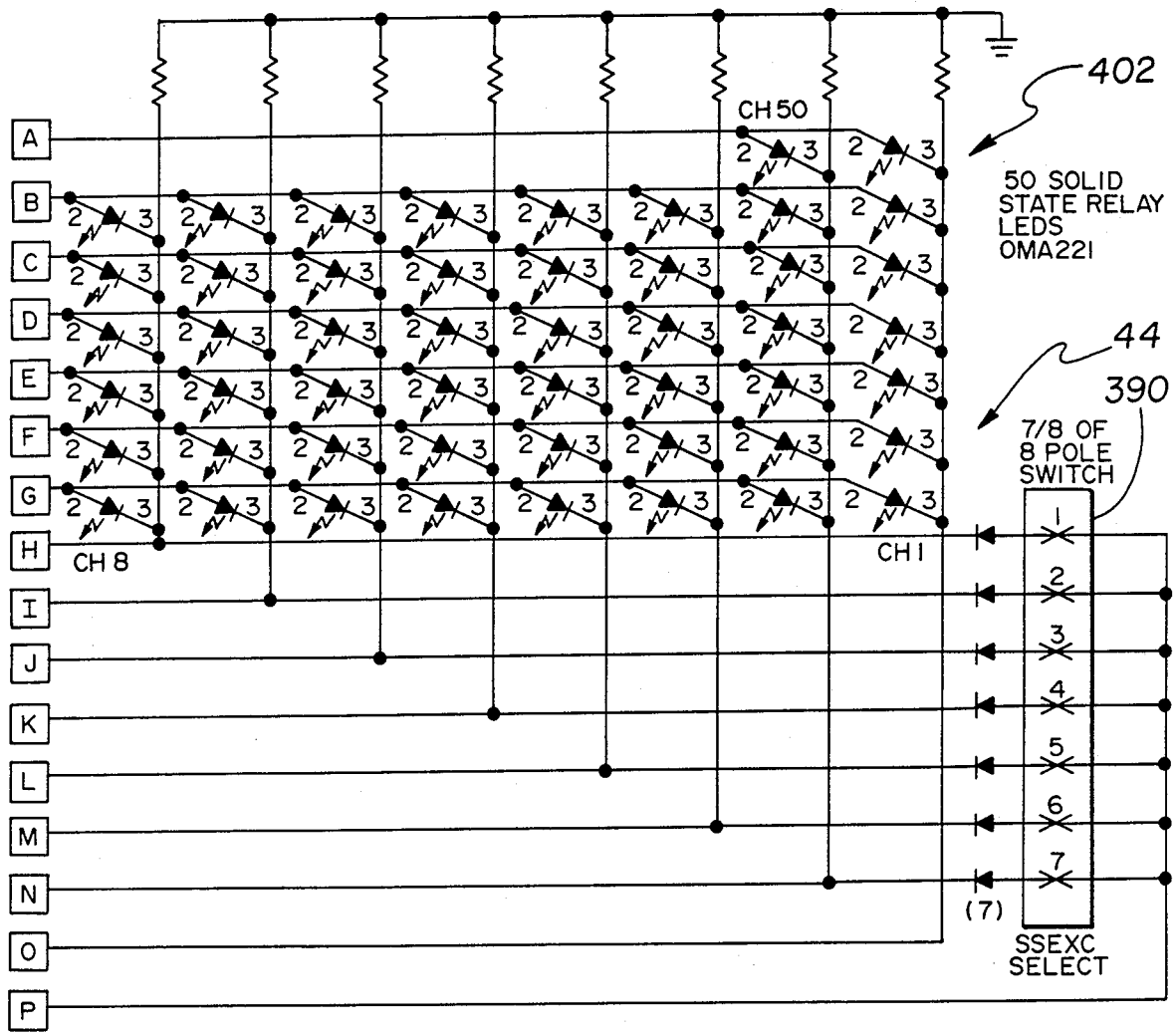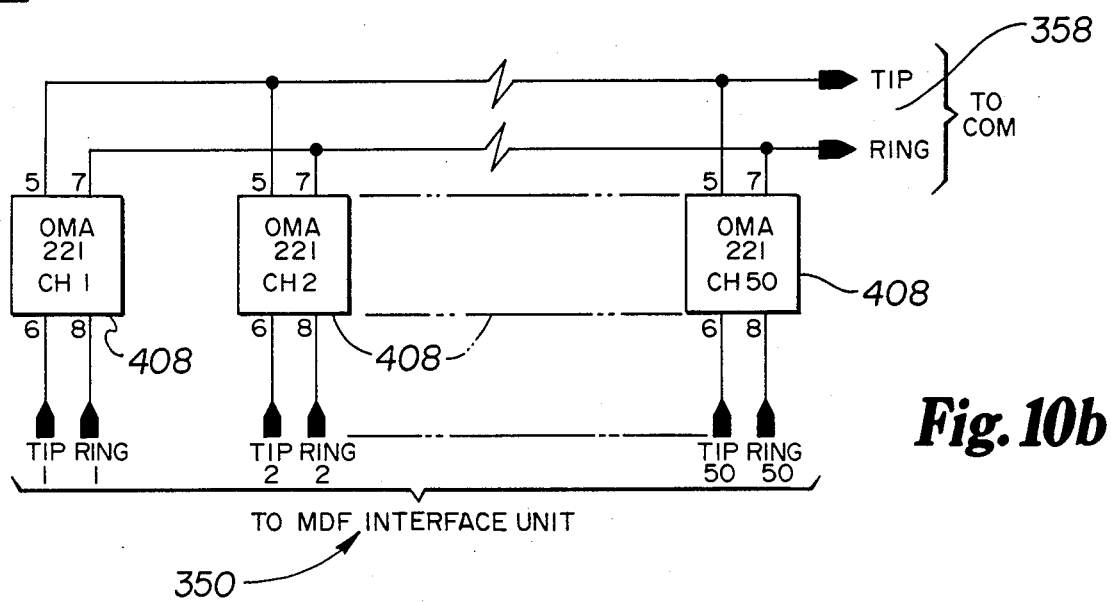
Fig. 10b

BI-DIRECTIONAL DATA TELEMETRY SYSTEM

BACKGROUND OF THE INVENTION

The invention relates to data transmission systems and particularly to data transmission between a central office terminal for a telephone system and remote customer premises, each of which is connected to the telephone system by conventional telephone lines.

Initial concepts for interconnecting residents of a city concentrated on a "wired city" concept whereby integrated digital services would be provided to each subscriber's premises over fiber optic or coaxial cable networks. In recent years however, emphasis has shifted to integrated voice and data transmission systems capable of operating over telephone subscriber loops which are in place today.

Data voice modems are in existence which permit the telephone line to be selectively used for analog voice transmissions over the telephone handset or for the transmission of data. Similarly other data transmission schemes such as FSK, PSK, and AM modulation techniques have been developed. These technologies have inherent limitations such as cross talk, data quality, error rate, signal strengths and security.

Spread spectrum technology, which was originally developed for military uses, has been applied in a few recent developments to overcome the inherent limitations of previous technologies. U.S. Pat. Nos. 4,425,642, 4,426,661 and 4,475,208, show prior applications of spread spectrum to data transmissions. It is not believed, however, that any of the prior developments has been sufficiently integrated into a telephone subscriber network such that all subscribers on all exchanges can be connected to not only the telephone utility but any other utility or service organization including those which transmit various forms of data and information to subscribers.

SUMMARY OF THE INVENTION

Using modular design, the system polls up to 5,000 subscribers per module upon command. Transmitting at a 75 baud rate each module polls over 30 subscribers per second. Transmission is half duplex with full error correcting protocol.

System operation uses the concept of packetized data and forward error correction techniques throughout the various modules of the system. Signal formatting and protocol are also optimized to assure that data is correctly exchanged between the inquiring utility and the remote subscriber premises. In order to handle 10,000 subscribers per telephone exchange with the system, various multiplexing techniques are employed as will be explained in greater detail below.

The various utility host computers preferably sequentially interrogate subscribers by telephone number. Communication between the utility host computer and the central office of the telephone company is by modem on a leased line. A network controller in the telephone central office formats data that is to be transmitted to or received from subscribers. The network controller is connected to one or more Central Switching Units, each consisting of common equipment modules (CEM) card which establishes a protocol to communicate with up to one hundred central office module (COM) circuits which are arranged four to a card in a twenty-five card rack or five to a card in a twenty card rack, using a unique protocol. Status, control commands and data are transmitted in eight bit words between the CEM card and each COM circuit. The transmission includes an acknowledge to be sure that data and control signals are transmitted without error to the COM card.

The COM cards are connected to solid state electronic cross connects in groups of fifty which are accessed in the manner of a scanner multiplexer which interconnect 5000 subscribers to each rack of central office modules. Thus to communicate with all 10,000 subscribers on a network two solid state electronic cross connect scanners are utilized. Each subscriber has a remote terminal unit which is connected to the telephone line, all of which are wired to the input leads/lines for the solid state electronic cross connects.

Communications between the COM cards through the solid state interconnects to the remote subscriber and communications from the remote subscriber are achieved with spread spectrum signals which include a 7-4-1 Hamming code for forward error correction as well as bit interleaving so that noise impulses on the line do not destroy or affect the correct receipt or transmission of data. Transmission is also achieved by longitudinal transmission which puts the data signal on both the tip and ring lines in phase. Since analog voice data is transmitted 180 degrees out of phase, differential transmission, the data when received on the voice circuit is rejected by common mode rejection. Data is taken off the telephone lines, both at the transmitting and the receiving end by summing the signal from both lines. Since the voice data or other analog transmission is 180 degrees out of phase that information is cancelled and the actual data transmission, when summed, produces a 6 db gain.

Other unique signalling techniques to achieve the objects of the invention are set forth in more detail below.

DESCRIPTION OF THE DRAWINGS

FIG. 3 is similar to FIG. 2 showing how the various elements are interconnected by twisted wire pairs, modems and the like.

FIG. 5 shows the central switching unit of FIGS. 2 and 3 which is divided into two essential components, the common equipment module (CEM) and the central office modules (COM).

FIG. 6 is a perspective view of the Central Switching Unit showing how the CEM and COM cards are arranged in a twenty-three inch rack in the Central Office of the telephone office.

FIG. 13, comprising

DESCRIPTION OF THE PREFERRED EMBODIMENT

The disclosed system of this invention is an extremely flexible data telemetry system which can be used to communicate, both transmit and receive, with a single telephone subscriber or to all subscribers on a telephone network. A basic object of the invention is a means and method to transmit eight bit data packets from one or more sources to any telephone subscriber having a remote terminal unit 21 and to receive similar eight bit data packets from that remote subscriber. As disclosed, the invention is shown in connection with a meter reading and load management system. It should be understood however, that this is for purposes of a complete disclosure and a preferred embodiment and that the communications network or data telemetry system can be utilized in other ways and for other purposes.

Figure 9:
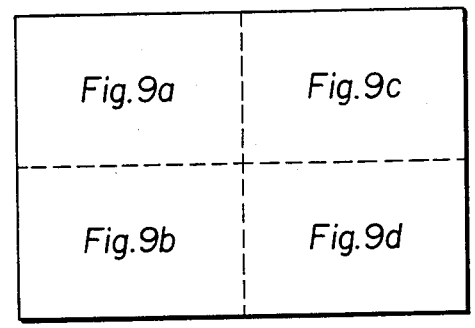
FIGS. 9a-d are schematic diagrams of a central office module.

A complete telemetry system according to the invention to service the ten thousand possible subscribers in a telephone exchange, xxx-0000 to xxx-9999 would include the following component modules, each discussed in more detail below. A network controller 25 (FIGS. 2,3) connects to the host computer 28 (FIGS. 1,3) to receive and transmit telemetry data packets 30. The basic telemetry packet, in an eight byte data block 30, consists of three bytes of pay load, three bytes of address, one byte which is a status control character and a one byte check sum. These packets are communicated to and from remote terminal units 21 for each subscriber. Two central switching units 34 (FIGS. 2,3, 5-9) are connected to the network controller 25 with a common equipment module 38 (FIG. 7) and one hundred central office module circuits 40 (FIGS. 8,9). Two hundred solid state electronic cross connect 44 circuits (FIG. 10) are used, each scanner consisting of fifty solid state electronic cross connect relays 48 (FIGS. 3,10), each solid state electronic cross connect circuit 44 connected to one central office module 40 circuit and to fifty subscribers. Each of the ten thousand subscribers has a remote terminal unit 21 (FIG. 12) which is programmed by the user or utility to receive the payload and address data and respond as programmed into the remote terminal unit 21.

Figure 4:
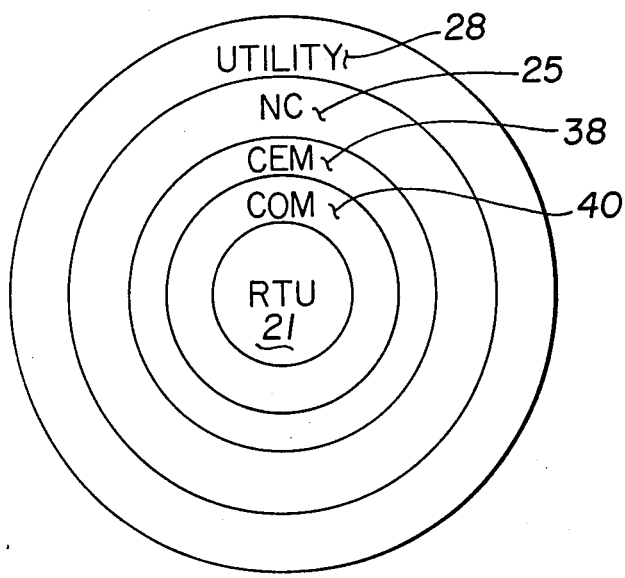
FIG. 4 shows the various levels of control hierarchy established by the modules of the invention.

FIG. 4 shows the four layer control hierarachy for half duplex exchange of data between a utility company computer 28 and remote terminal units 21 through the central office of a telephone exchange. The data transmissions between the utility 28 and the subscriber 21 via the telephone loop are eight byte messages 74. The raw data burst 74, in its most fundamental form, is sixty-four bits long (8 bytes).

The data paths for the entire system generally is the core raw data burst 74 surrounded by routing, addressing and error correcting information.

The remote terminal unit 21 is connected to the peripherial equipment 60 and polls the equipment 60 by means of the eight byte messages 74 including three bytes of address and three bytes of information which are established by the utility company.

The remote terminal unit 21 and the central office modules 40 have a specific half duplex data exchange. This exchange is initiated by the central office module 40 selecting a given subscriber through the channel's solid state electronic cross exchange interface 44. The central office module 40 then sends the down loaded eight byte block 74 to the remote terminal unit 21. If the subscriber remote terminal unit 21 receives the block correctly, the remote terminal unit 21 responds with the requested data 74 again in its eight byte block. At this point the central office module 40 verifies the incoming data 74 and issues an eight byte acknowledgment block. The central office module 40 then flags that the data exchange has taken place and data from the remote terminal unit 21 is then transmitted back to the utility 28 through the network controller 25.

The common equipment module 40 multiplexes and demultiplexes the data 24 between each subscriber channel on the central office module cards 40 and the network controller 25. The common equipment module 40 buffers data 74 for transmission to and from the remote terminal unit 21 and the network controller 25. The common equipment module 40 also generates diagnostic and problem indications for access by the network controller 25.

The common equipment module card 40 handles all bus control and data transfer. ALE transfers are always two cycles for each data transfer. The ALE (Address Latch Enable) line determines if the data bus contains address/control 150,160 or data words 162. The address/control 160 transfer is a write to the bus only. As indicated, the data 162 can be bi-directional transfer.

The solid state electronic cross connects 44 are located at the telephone company central office. They connect the central office central switching units 34 one common equipment module 38 and one hundred common office modules 40 to the telephone company main distribution frame (MDF). There are one hundred solid state electronic cross connects 44 per central switching unit 34, one per channel 40. Each solid state electronic cross connect 44 interfaces at the main distribution frame with fifty subscriber telephone lines.

Since the remote terminal units 21 interconnect to the subscriber line prior to the telephone hand set, data transfers can occur regardless of whether or not the telephone hand set is on or off hook and, therefore, regardless of whether or not the telephone line is being used for analog exchange of voice information.

Figure 1:
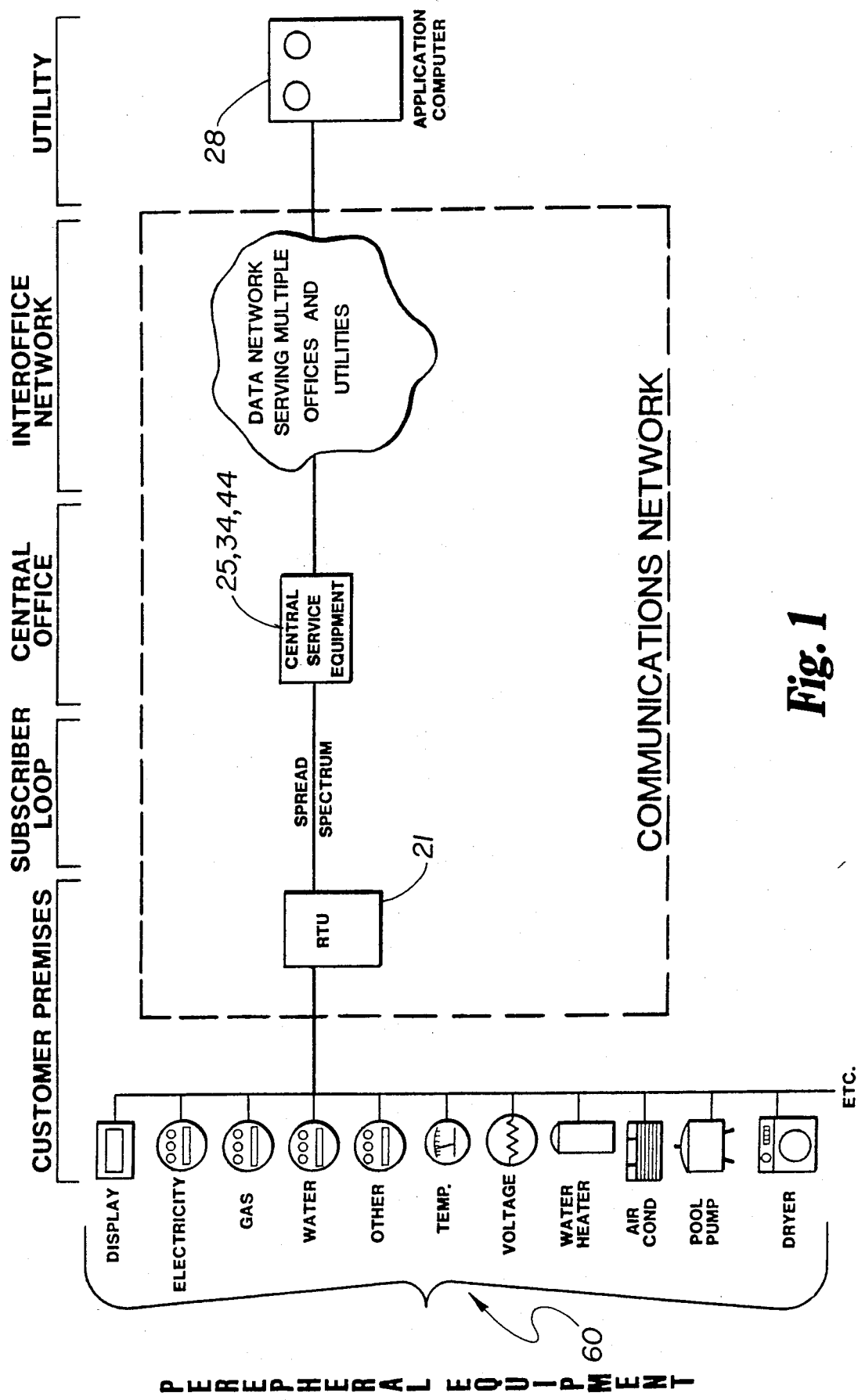
FIG. 1 is a basic schematic of the data telemetry or communications network as used with a meter reading and load management system.
Figure 2:
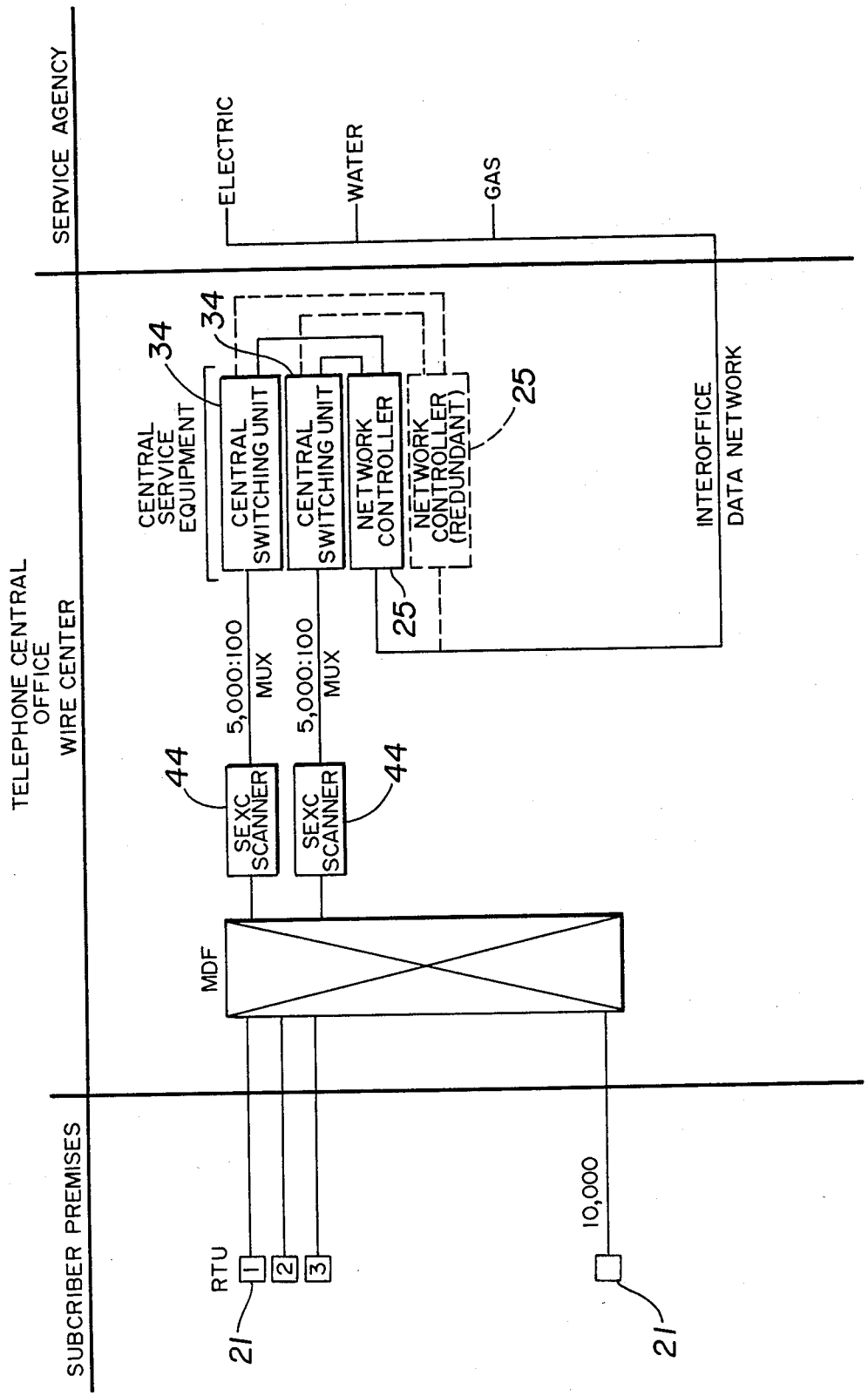
FIG. 2 is a block diagram of the basic units as apportioned between the subscriber premises, the telephone central office and the service agencies or utilities.
Figure 3:
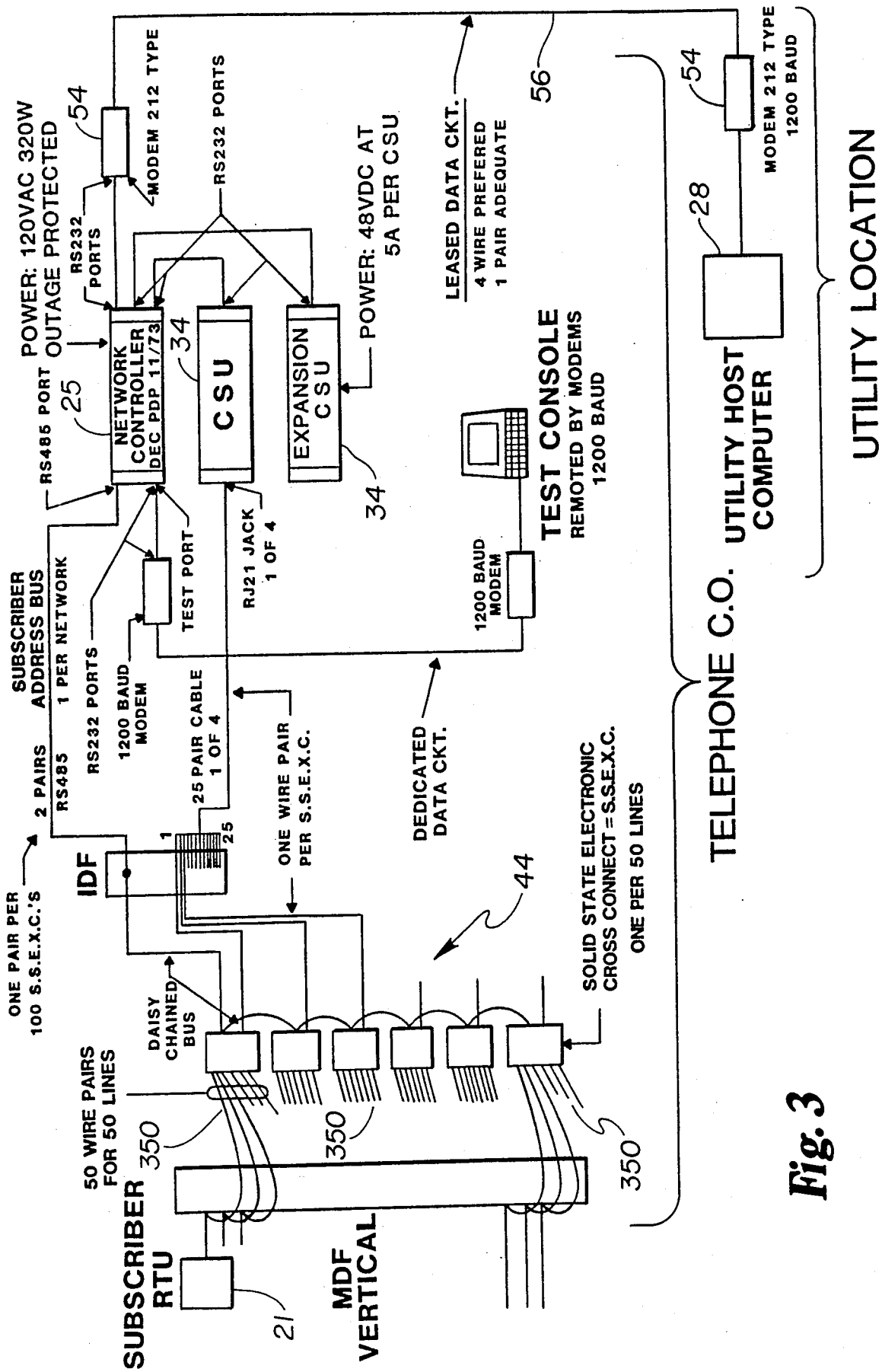

Referring to FIGS. 1-3, the use of the data telemetry system of the present invention, and the component elements of the system are shown in block diagram form. When used as a meter reading and load management system, the originator of services, electric, water and gas utilities can each communicate with a network controller 25 through conventional high speed modems 54, preferably on a leased or dedicated line 56. The subscriber is identified by his or her unique subscriber address and while an eight byte block of data is described in connection with the preferred embodiment, the system is currently configured to access up to 32 bytes of transmitted and received data for remote peripherals 60 to be read or controlled.

As represented on the left side of FIG. 1, peripherial equipment 60 which might be utilized on such a system includes LCD displays to display data or other information from the utility company, meter readings such as electric, gas, water and the like using pulse counting or digital encoding techniques. The reading of temperatures and voltages or other analog inputs, switching control and status for high power consuming appliances such as the water heater, air conditioner, pool pump, dryer and the like. Any information which is susceptible of being converted to digitized data reading or switchable components lend themselves to operation and control according to the present invention.

The utility host computer 28 is connected to the data modem system through one or more network controllers 25 such as a Digital Equipment Corporation PDP 11/73 computer. More than one network controller 25 can be used for high loading of the system. Additional network controllers 25 may also be used in a redundant manner to assure proper operation of the controller 25 wherein the controllers 25 compare receive and transmit information and a correctly operating controller 25 assumes control in the event of disfunction of any of the controllers 25.

As shown in FIGS. 1-4, a fully developed system configured to serve 10,000 subscribers on a telephone exchange would include a single network controller 25 for each exchange and two central switching units 34, one for each 5000 subscribers.

Shown in FIG. 5, is a single shelf 34 showing twenty central office module cards each card having five central office module circuits 40 all of which are controlled by a single common equipment module or controller card 38 which is interconnected to each of the central office module cards along a back plane bus.

Referring now to each of the drawings the structure, function and operation of the components of the system can be described and understood.

The utility host computer or computers 28 interconnect with the network controller 25 using high speed modems 54 and RS 232 interface connections to be sure the data has passed between the computers 25,28 without interruption. The network controller 25 receives the subscriber identification, the address, and in the eight byte data packet, the particular peripherial equipment 60 that is going to be read or controlled. From an internal data table in the memory associated with the network controller computer 25, the network controller assembles and formats data to be transmitted to the appropriate central switching unit 34.

Figure 14D:
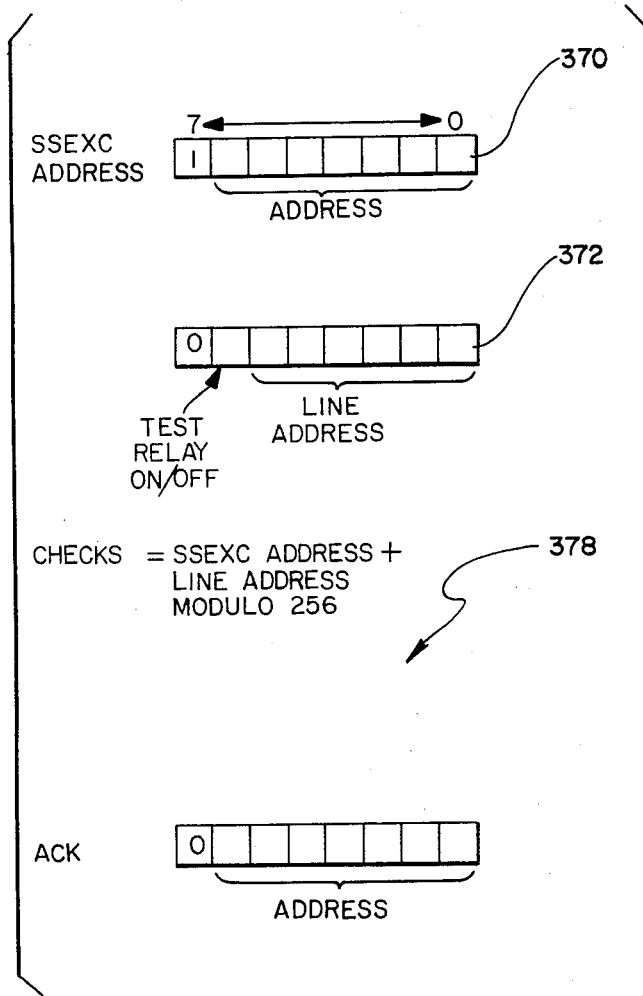
FIG. 14, comprising FIGS. 14a through 14d, comprise representations of data format and data protocol used in communicating information with use of the invention.
Figure 13C:
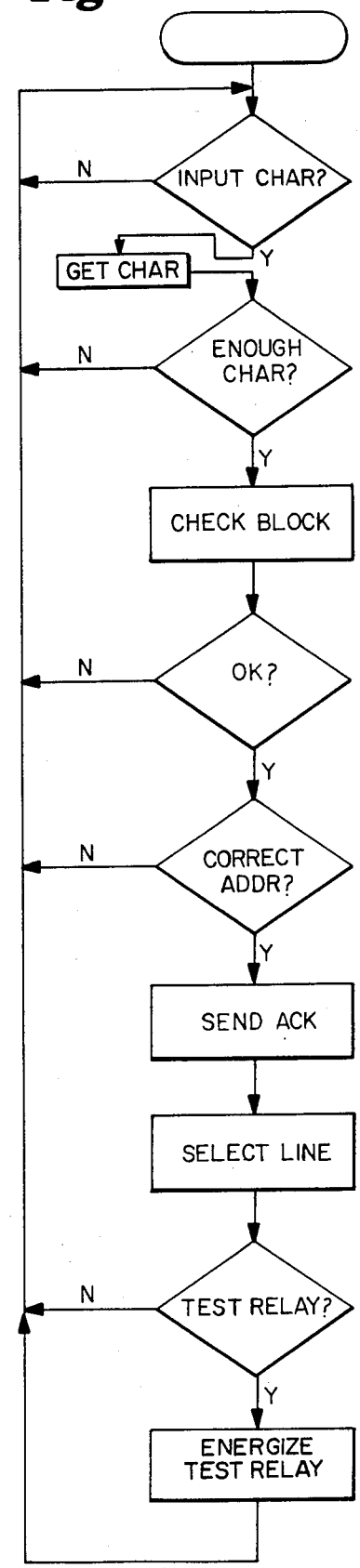
Figure 14A:
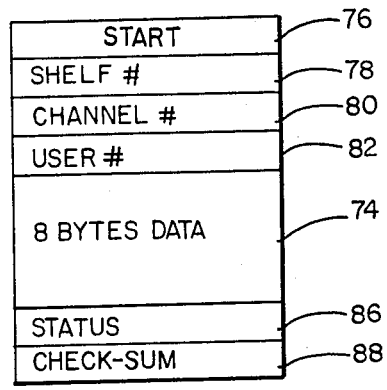

The format of the data is set forth in FIG. 14a. As illustrated in FIG. 14a each block of data consists of eight bit bytes 74 which are sequentially transmitted to the appropriate central switching unit 34. The bytes include a start byte 76, the shelf number 78 which identifies one of the central switching units 34, the channel number 80 which identifies one of the central office module circuits 40 on the shelf 34, the user number 82 which is one of the 50 lines connected to the associated solid state electronic cross connect 44, and then sequential bytes of data 74. These data bytes 74 when transmitted include in addition to data to be transmitted, polling instructions such as control words to read meters 60 or to perform switching functions at the peripherial equipment 60 or remote subscriber location or to display data.

When received from the remote terminal units 21, data is passed by the central office module circuit 40 in the same format to the network controller 25, with the eight bytes of user information 74 including the meter readings, acknowledgement of switch or control information, status and the like. Following the user data a status byte 86 is included for control purposes as well as, a check sum 88 to be sure that the data and information has been transmitted correctly between the network controller 25 and the central office module 40. If the check sum 88 does not indicate correct transmission or the receipt of the correct information from the utility, the data 74 is retransmitted.

Figure 7A:
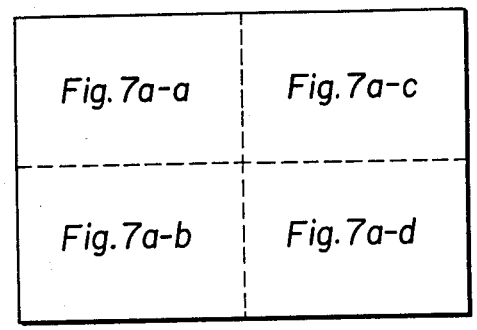
FIG. 7 consisting of FIGS. 7a and 7b, 7a—a-7a-d; 7b-a-7b-d are detailed schematics of the common equipment module (CEM).
Figure 7B:
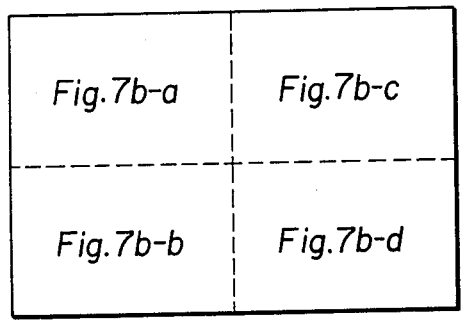
Figure 8:
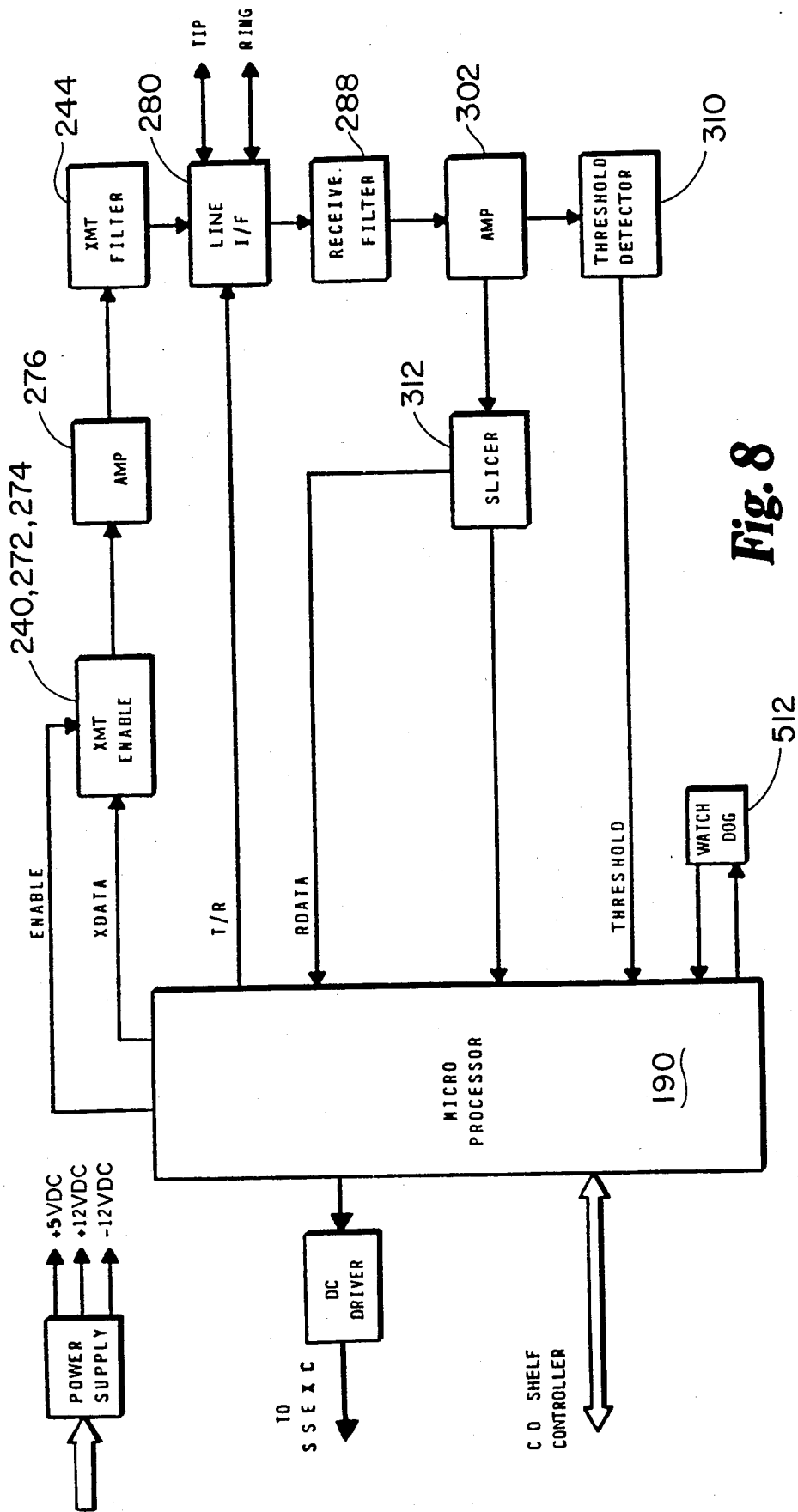
FIG. 8 is a block diagram of one of the central office modules (COM).
Figure 9A:
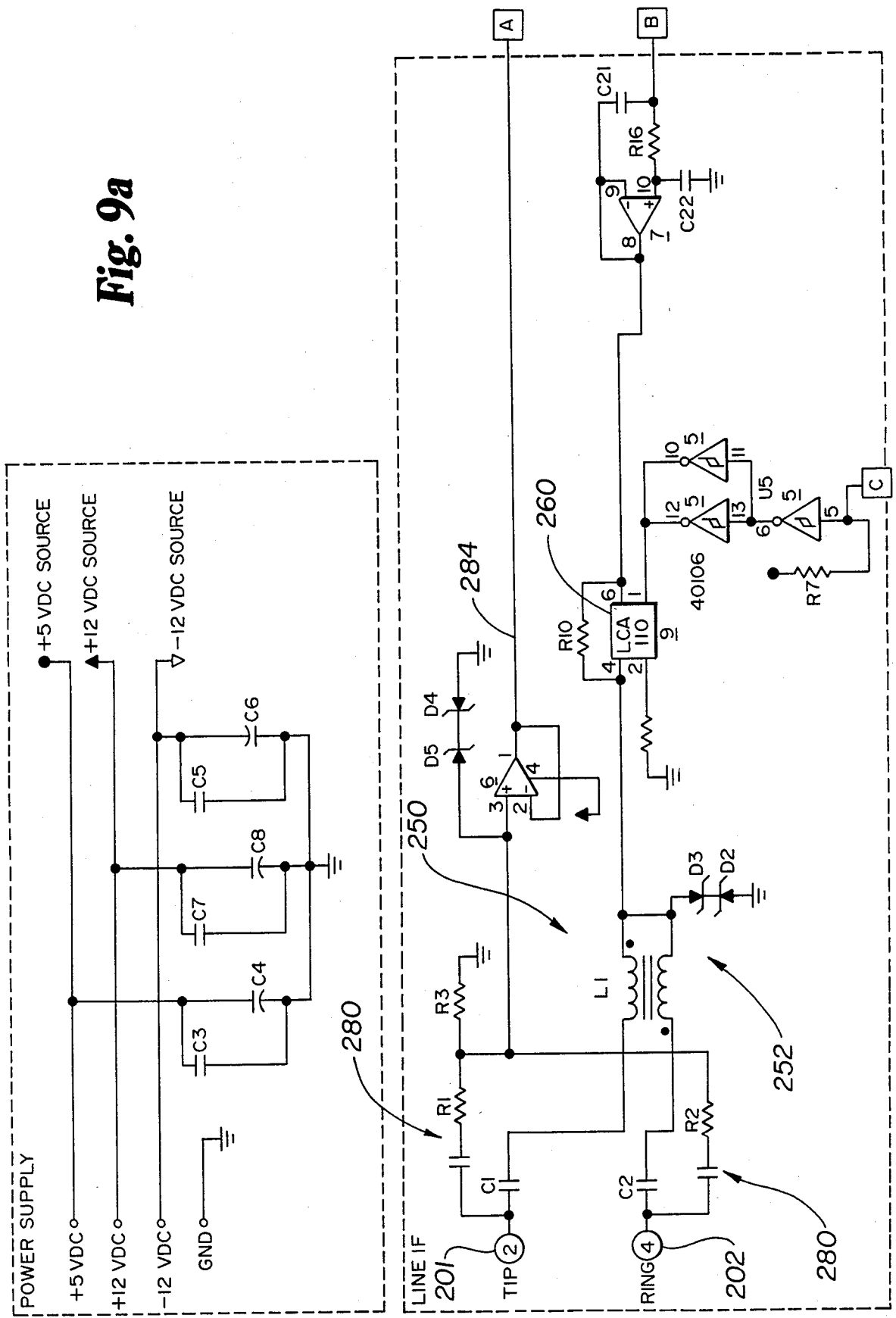
Figure 9B:
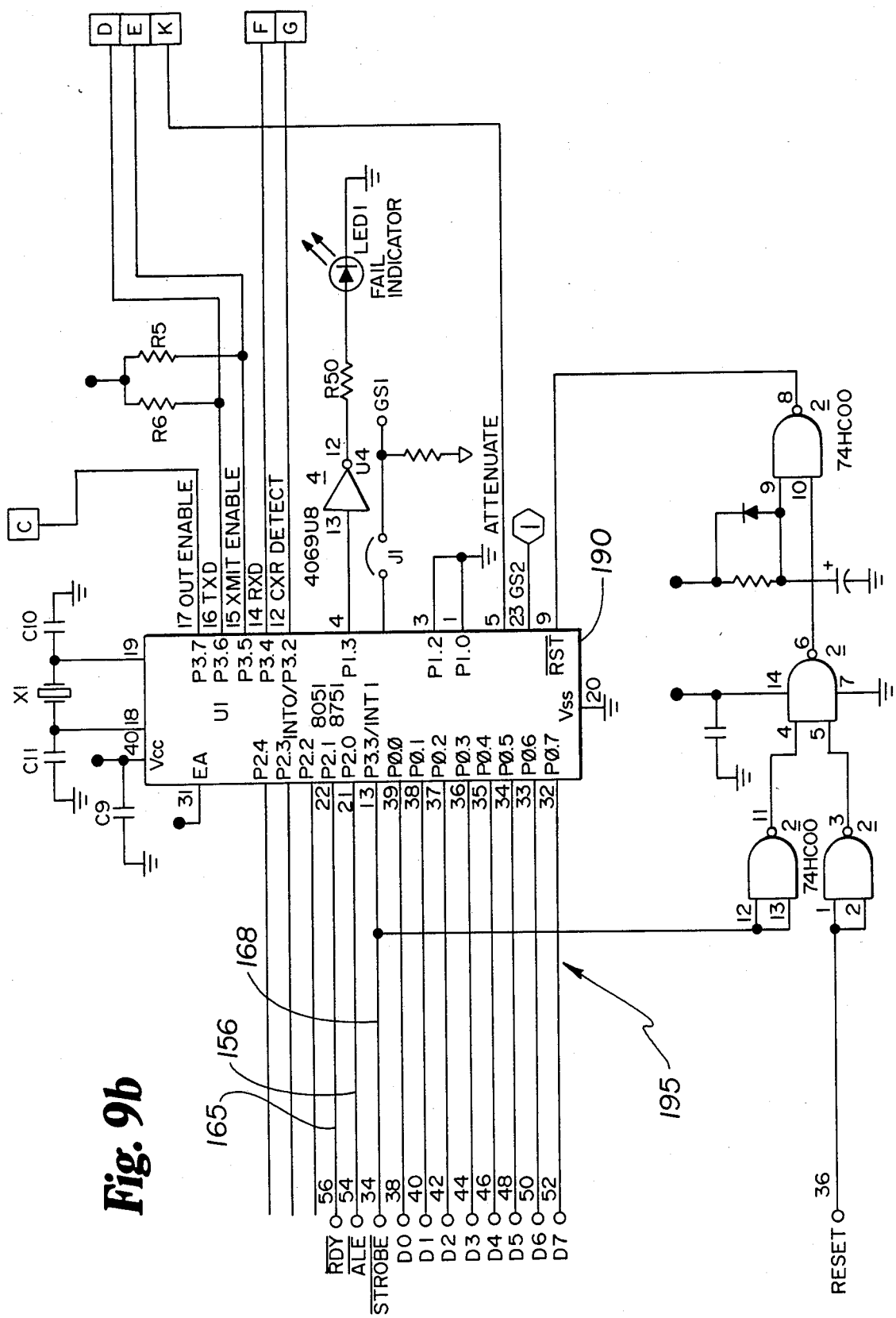
Figure 9C:
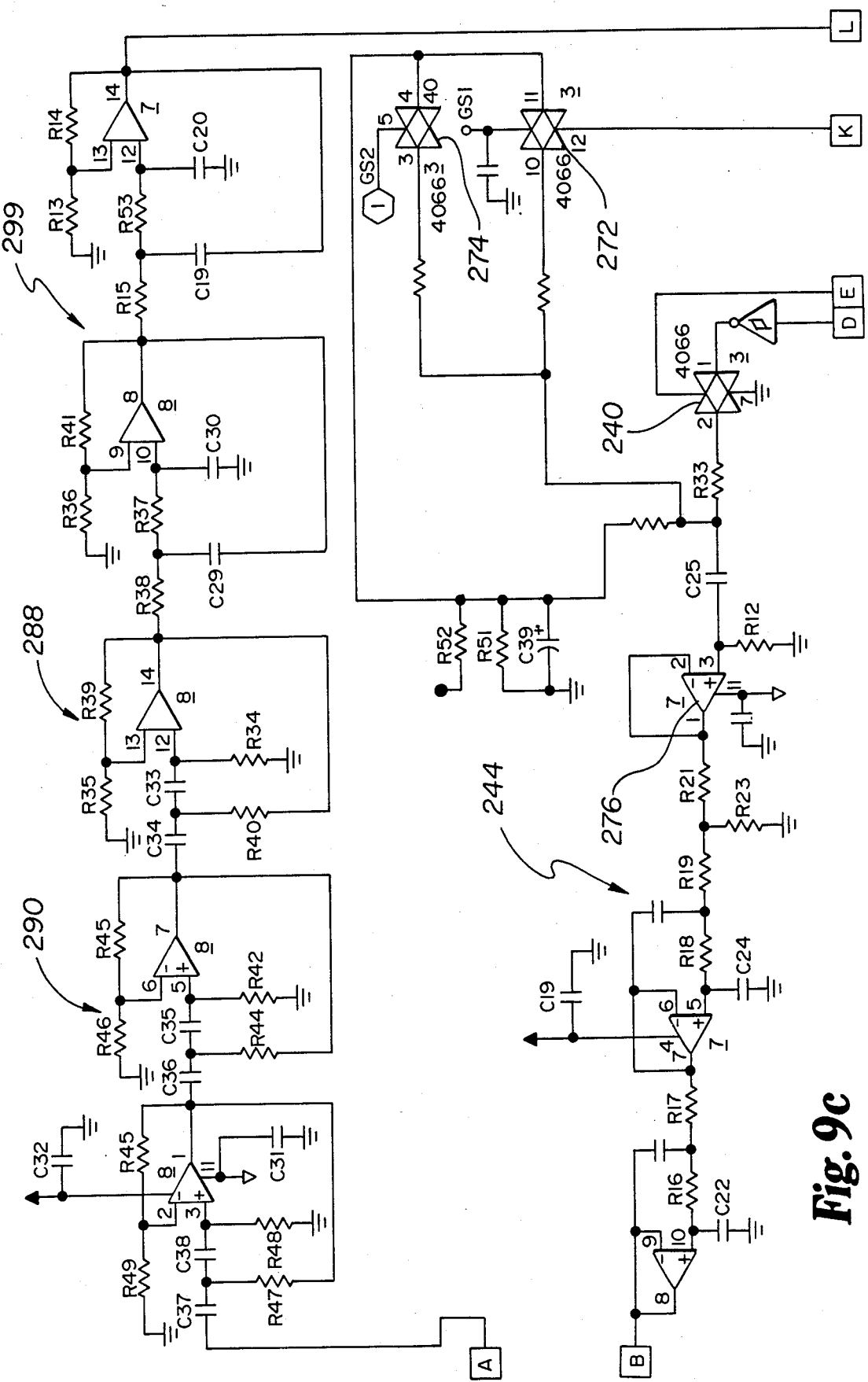
Figure 9D:
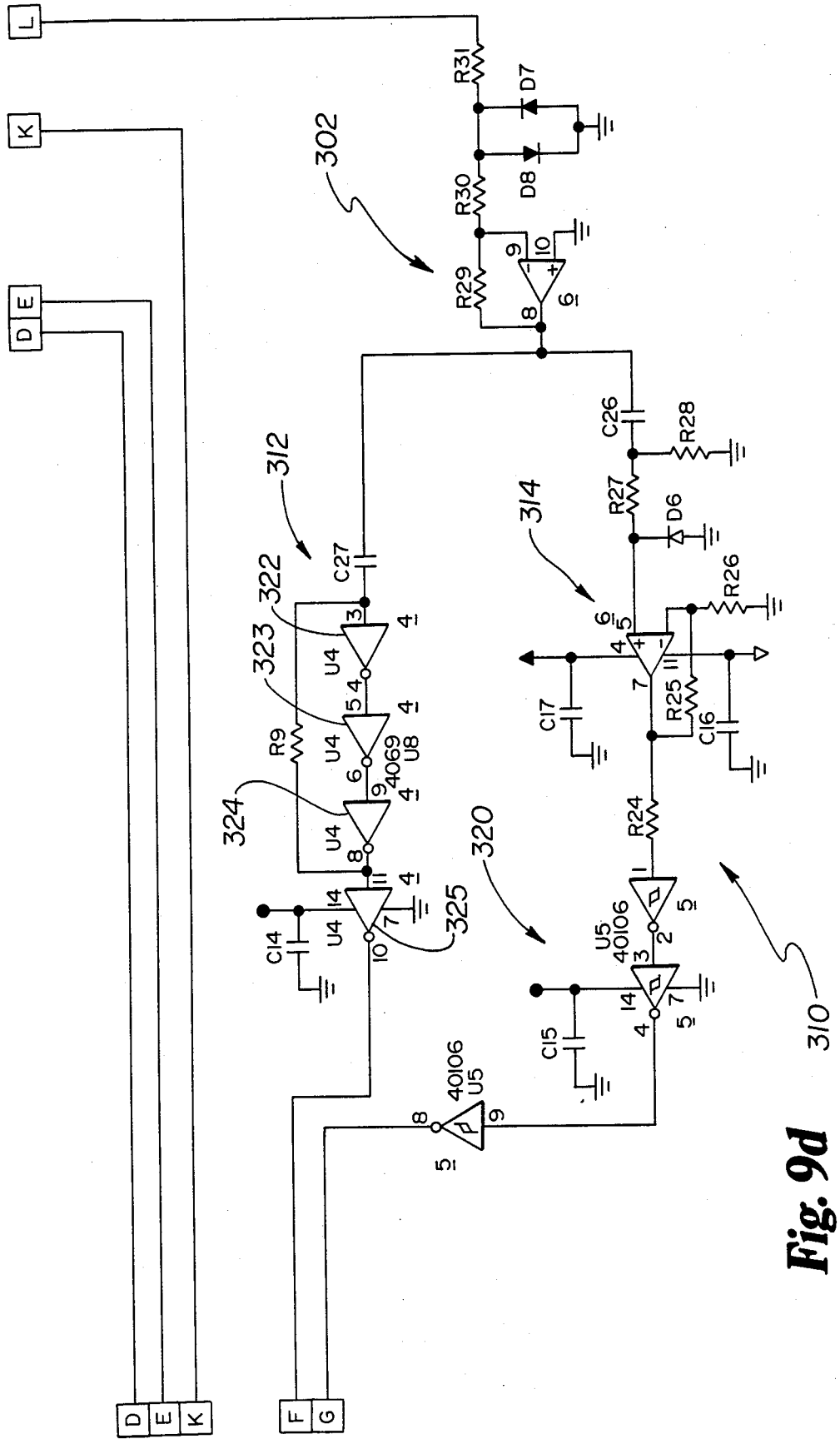
Figure 10A:
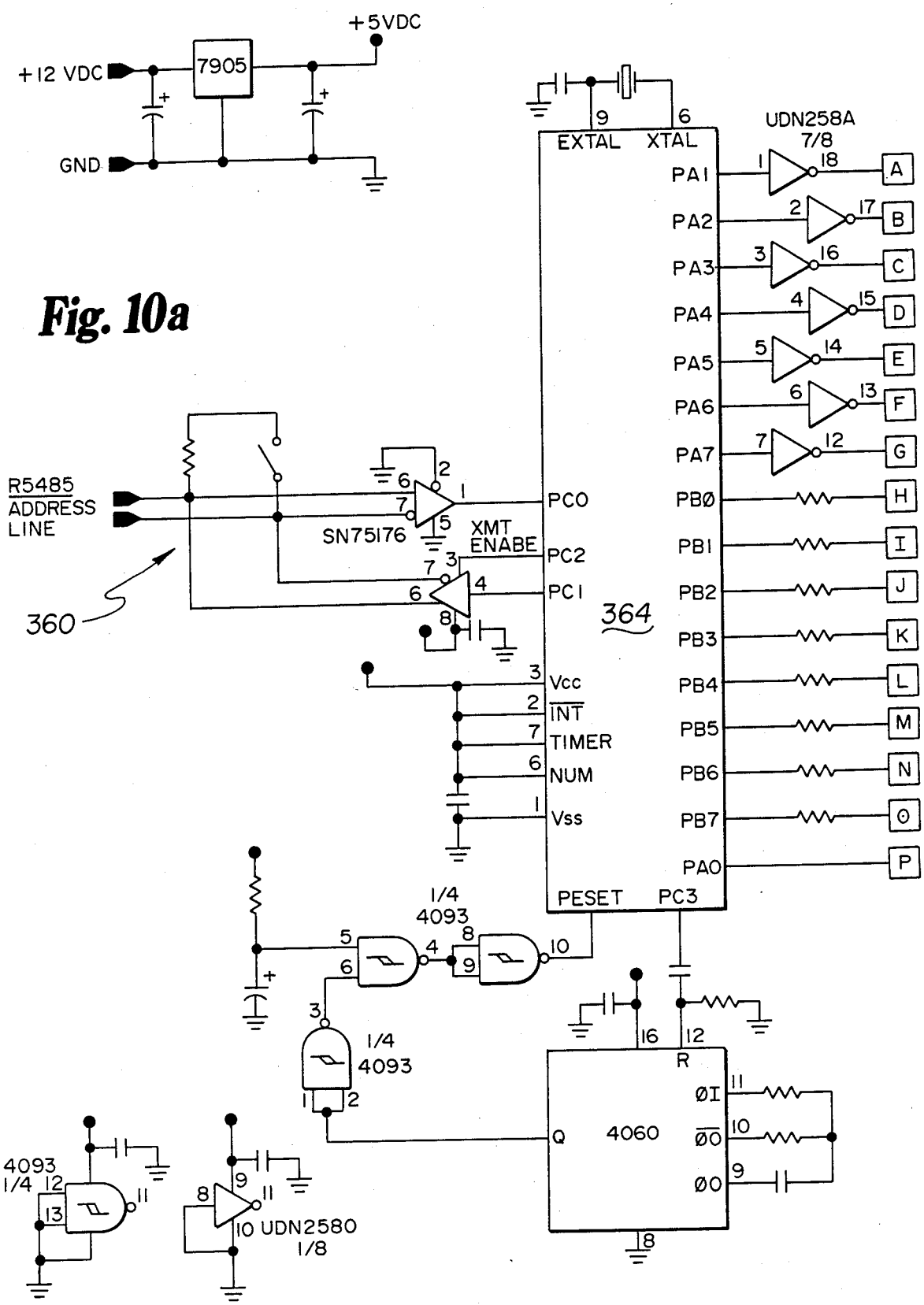

The common equipment module (CEM) 38 comprises a single card, a detailed schmematic of which is shown in FIGS. 7a and 7b, and a back plane of the shelf 34 which interconnects the CEM card 38 to each of the twenty or twenty-five central office module (COM) cards 40. The CEM card 38 operates as a master control in a master slave relationship for all communications with the remote terminal units 21. The CEM card 38 multiplexes and demultiplexes the data between each subscriber channel and the network controller 25. The CEM 38 also buffers data for transmission to and from the RTU's 21. The CEM 31 is also used to generate diagnostic and problem indications for access by the network controller.

The CEM card 38 consists of an 8085 microprocessor 104, programming in an erasable programable read only memory 106, a multiplexer/demultiplexer 108 to switch between addressable registers on the card and between control and data transmissions, and a static random access memory 110 for the storage and manipulation of data received and to be transmitted. The circuitry also contains two counters 112,114, one 112 which is part of a watch dog circuit and the other 114 of which is based on the clock to generate the baud rate for the transmission and receipt of data. Two input/output ports 118,120 are also utilized, one 118 for addressing and the other 120 for memory manipulation. A dual universal asyncronous receiver/transmitter chip (DUART) 125 is used with one UART 128 connected to interface with the network controller and the other UART 129 connected to interface with the solid state electronic cross connect circuits 44.

Referring to FIG. 7a, the various registers are shown. A first latch 130 is used as a control register which is interconnected to a pair 132,133 of one of sixteen decoders to strobe specific COM cards 40 when a communication is to take place on that card 40.

A failure analysis circuit 135 is interconnected with the microprocessor to indicate programming problems and circuit or line failures. Two latches 142,143 are interconnected to form a data bus register. A fourth latch 145 is used as a switch register for a DIP switch 148 into which is manually programmed the shelf 74 number and the baud rate for communications.

The mode of operation or protocol of operation of the CEM card 38 is essentially as follows. The network controller 25 provides data to the CEM card 38 in the form shown in FIG. 14a. The data is received by the CEM card 38 and stored in the static ram 110. The check sum 88 is verified to be sure the data has been received accurately. The dip switch 148 is read through the switch register 145 and the shelf 34 number 78 transmitted by the network controller 25 is verified by the microprocessor 130. The microprocessor 130 calculates the COM card 40 to be strobed through the control register 130 and one of the one of sixteen decoders 132,133 by dividing the channel number 80 by four or five depending upon the number of COM circuits 40 on each card. The user number 82 is connected through the DUART 129 to set up the solid state electronic cross connect 44 which will be discussed below. Thereafter data is transmitted to the COM cards 40 using a sequential protocol which transmits command words followed by data words in the following manner.

Figure 14B:
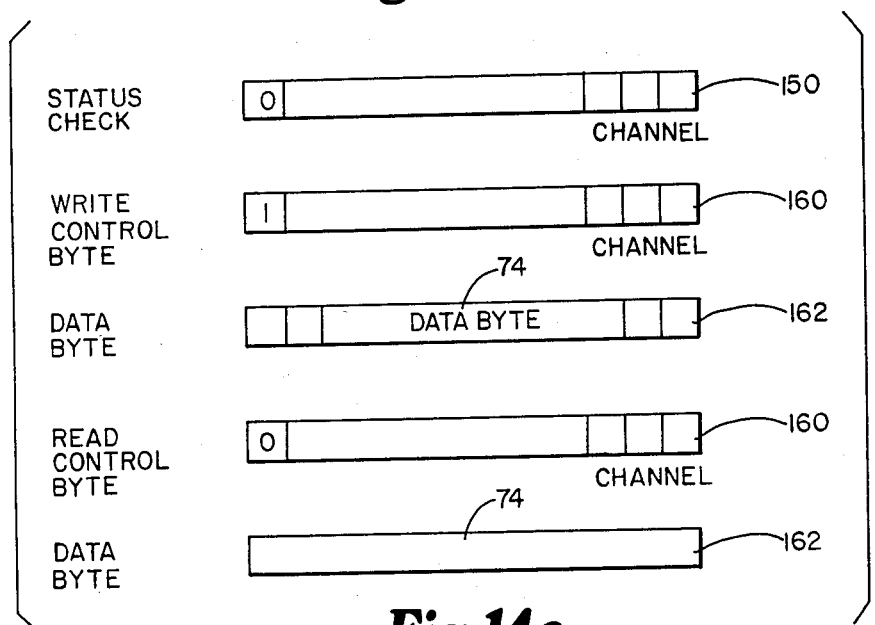

Initially status of the particular channel, that is whether or not it is busy, is checked using the eight bit transmission 150 shown in FIG. 14b. As shown in FIG. 14b, the protocol of communication between the CEM card 38 and the COM cards 40 is initiated with the first eight bit byte control word 150. The first control word 150 is a status inquiry. Thereafter, transmissions are alternated with the use of the ALE line 156 with two cycles for every data transfer. The ALE line determines if the data bus contains address/control words 160 or data 162. The data can be a bi-directional transfer. All transfers are controlled by three control lines, the ALE line 156, the ready line 165, and individualized card strobes 168.

With control or status words 150,160, the most significant bit, bit 7 is set to a zero or one with zero being a "read" command and one being a "write" command. The least significant bit is the control bit and bits one through three indicate the channel, one through five on a twenty card rack and one through four on a twenty-five card rack. Alternate bytes 162 contain eight bit data to or from the user-subscriber as indicated in FIG. 14b.

All data outputs 150,160,162 must be stable until the ready line 165 goes low. All data 162 reads must not be read until the ready line 165 goes low.

Therefore, data transfers take place as follows.

Figure 13A:
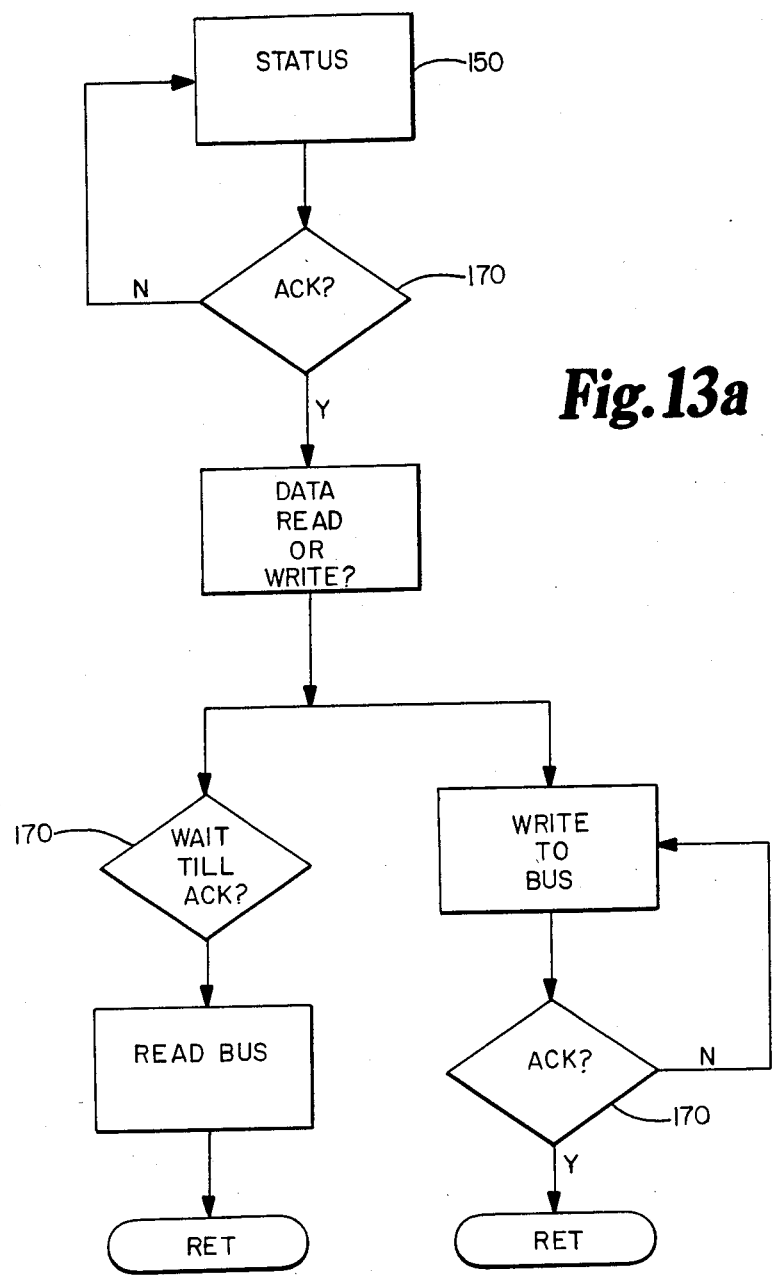
FIGS. 13a through 13c, are flowcharts of computer programming used in the data telemetry system.

The status control word 150 is sent to the COM card 40 which inquires whether or not the channel is busy. If not busy, signified by an acknowledge, a first command word 150 is latched into the data bus register 142,143. The particular COM card 40 to be accessed is latched into the control register 130 to create a low strobe 168 from the one of sixteen decoders 132,133 to that card 40. The ALE line 156 is sent low to indicate a command word 150,160 is to be transmitted and after the bus is stabilized, the ready line 165 is clocked low. This transmits the command 150,160 word indicating the data transfer to take place and the channel upon which it is to take place. After the particular COM circuit 40 has been prepared to receive the data word 162, the data word 162 is then clocked into the COM module 40 using the same process and procedure. As shown in FIG. 13a, all transmissions 150,160,162 to and from the CEM card 38 to any COM card 40 are acknowledged 170 for purposes of error-free transmission so the data does not get lost while communicating between modules.

When the data 162 has been transmitted fully from the CEM card 38 to the selected COM channel 40, a data transmission "33" takes place signifying to the COM card 40 that the data 162 can be and should be transmitted by the COM card 40 through the solid state electronic cross connect 44 to the addressed remote terminal unit 21.

Referring to FIGS. 8 and 9, the method of achieving the transmission with the central office modules 40 can be understood. As shown in FIG. 9, a microprocessor 190 with internal memory receives alternately each command word 160 and data byte 162 on the eight line data bus 195, the microprocessor 190 being conditioned to do so by the ready line 165, the ALE line 156 and the strobe line 168 to the card. The programming for the microprocessor, shown in FIG. 13b, formats the data for transmission in a manner similar to that disclosed in pending U.S. patent application Ser. No. 591,509, now U.S. Pat. No. 4,672,605, issued June 9, 1987, entitled Data and Voice Communications System, the disclosure of which is incorporated herein by reference, and then causes the data to be transmitted or received longitudinally on the tip 201 and 202 ring through the solid state electronic cross connect 44.

To achieve duplex operation, time compression multiplexing techniques are used. The frequency separation of the data above the voice frequency on the telephone line avoids interference with analog voice communications. Spread spectrum techniques are used to minimize the effects of pair to pair cross talk. This is achieved with a 511 bit maximal length PN code 208 which is modulo 2 added 210 with the data. Data words are block encoded 214 for transmission using a 7-4-1 Hamming code for each four bit nibble of data to be transmitted. This encoding enables the detection and forward correction of errors when received.

In addition, the bits to be transmitted are interleaved 220 so that all bits of each word are transmitted sequentially. Thus, a transient noise disruption or other disruption on the telephone line which destroys bits during a burst will only destroy one bit of any transmitted code word, enabling error detection and correction techniques to accurately reconstruct the data word according to the Hamming code which was originally transmitted. Thereafter, the PN coded cells are encoded 230 using a tri-phase modulation scheme.

Figure 14C:
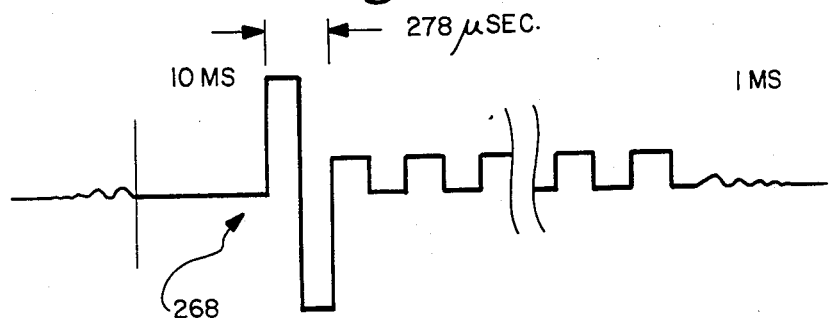

The format for the bi-directional data transmissions between the COM cards 40 and remote terminal units 21 are shown in FIG. 14c.

Figure 13B:
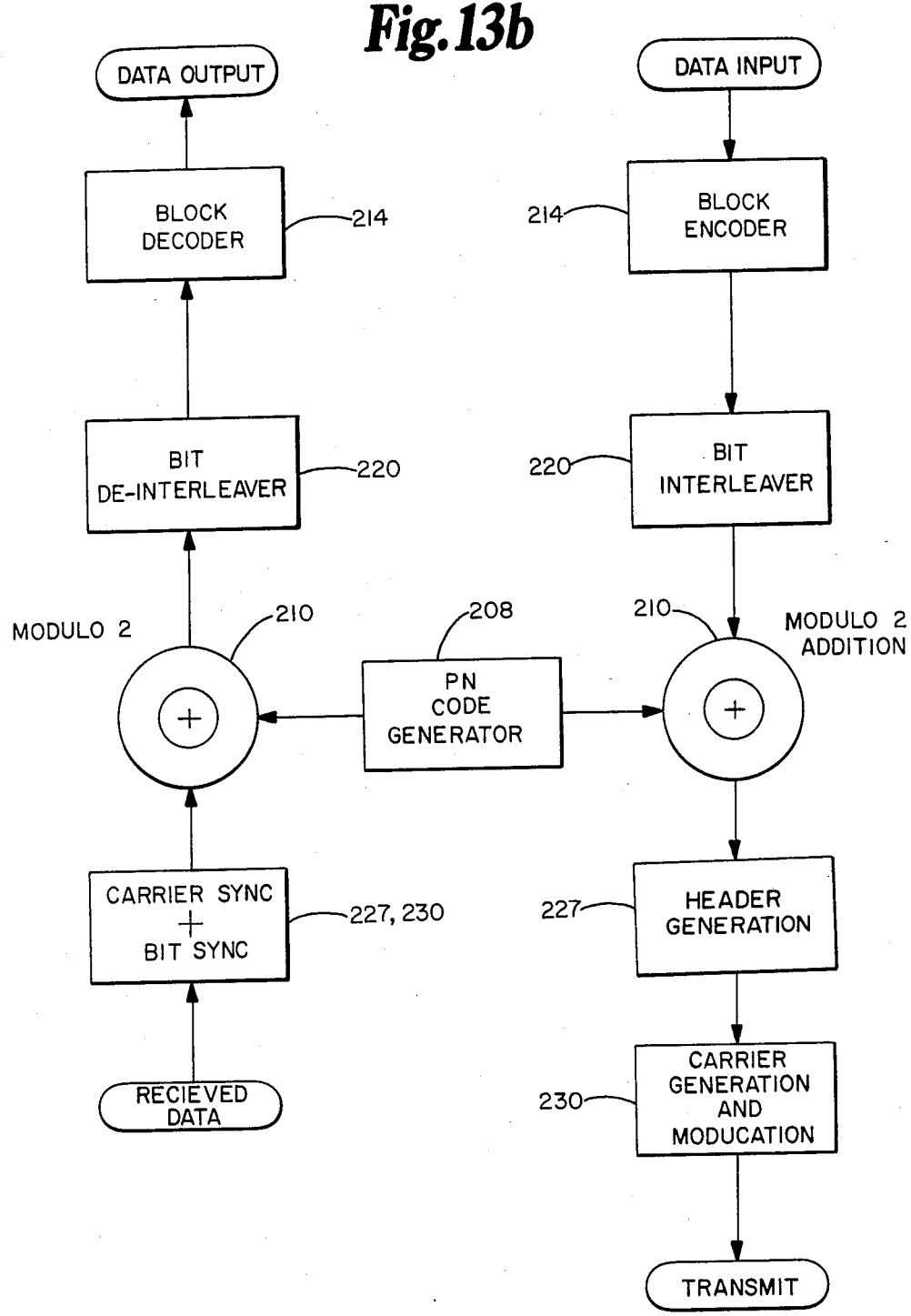

Encryption of the data for transmission over the telephone line, thus, takes the following form. The raw data burst 74 is eight bytes (sixty-four bits) long at seventy-five baud. Each raw data byte is split into two four bit nibbles. Three parity bits are added to each nibble for forward error correction 214 in accordance with the 7,4,1 Hamming code, producing two seven bit words per byte (112 bits total). Each of the bits are then interleaved 220 so that all orders of significant bits are transmitted sequentially. Each bit is then modulo-2 added 210 to a twenty four hundred baud PN code. This five hundred eleven bit code 208 is generated by the polynomial one plus X to the minus fifth power plus x to the minus ninth power. Thus, each of the 112 bits are represented by a thirty-two bit PN coded cell. That is, thirty-two bits at twenty-four hundred baud represent one bit at seventy-five baud. Finally, an eight bit header 227 is added to the beginning of the data burst. The PN coded cells are then next encoded using a tri-phase modulation scheme 230 using a level change of high, low, high for a one bit and a level change of low, high, low for a "zero" bit in a cell. This encoding is done on a thirty-six hundred hertz carrier where one and one half cycles of carrier correspond to one bit of a twenty-four hundred baud PN coded cell. Decoding reverses the process as shown in FIG. 13b.

Referring to FIG. 9, three outputs from the microprocessor are used to transmit data. The encrypted data to be transmitted from pin P 3.6 is connected through a gain switch 240 which is connected through an output filter 244 to the line interface circuit where it is connected longitudinally to both the tip 201 and ring 202 outputs with the use of a 1:1 bifilor wound transformer 252.

An output enable signal on pin 17 turns on the output of the low pass filter 244 through a Theta J relay 260 to allow the data to go over the line. As shown in FIG.

14c, the transmitter is connected to the line ten milliseconds prior to transmission and disconnected one millisecond after the XMT enable is deactivated this enables a smoothe send on/off control for the transmitted signal.

The initial two bits 268 of the header code are transmitted at zero dBV. This conditions the transmission and assures a carrier detect at the remote terminal unit 21 when transmitting and at the COM card 40 when receiving. After the first cycle of the header, the GS2 output from the microprocessor 140 on pin 23 goes high which attenuates the signal to $-30$ dBV. The average transmission over 100 milliseconds is thus $-30$ dBV which meets regulations of the FCC for data transmissions on an analog line.

If the line upon which the transmission is taking place does not meet FCC standards, errors will be noted in the transmission and the microprocessor will cause GS1 to go high. This will cause the transmission to occur at $-20$ dBV. Appropriate gain switches 212,274 are provided for these purposes.

The longitudinal coupling through L1, 250 puts the same data signal on both tip 201 and ring 202. Thus, the data will be removed from the voice analog circuit at the remote site by common mode rejection, since the analog voice signal is on tip 201 and ring 202 by differential transmission, that is, the signals are 180 degrees out of phase with one another.

The received signal from the remote unit is received on tip 201 and ring 202 and, after DC isolation 280, is attenuated, preferably 10 to 1 and connected to a coupling circuit consisting of an op amp 284 and associated components. The output of the op amp is connected to a bandpass filter 288 consisting of three op amps connected as a high pass filter 290 and two op amps connected as a low pass filter 299. The high pass filter 290 attenuates frequencies of 60 hertz and harmonics of the 60 hertz frequencies and the low pass filters 299 attenuates noise and other frequencies above the bandwidth of the transmission which is in the range of 1.2 kilohertz to 9.4 kilohertz. The output of the high pass filter 299 is connected through a limiter/amplifier 302 to clip the signal to limit transient voice spikes and the like to the voltage drop across the diodes and applied to a single stage inverting amplifier.

The output of the limiter/amplifier 302 is then connected through two circuits 310,312 to the microprocessor. The first circuit 310 is a carrier detector threshhold circuit through which the voltage is rectified and amplified with amplifier 314 and then passed through schmidt trigger inverting buffers 320 to give a clear carrier detect. The second path is a hard limiter 312 consisting of three inverting CMOS gates 322-324 and an inverter 325 which is connected to the received data. The three cascaded inverters 322-324, with a final inverting gate 325 to retain proper phrase, constitute a high gain bit slicer 312 which is connected to the microprocessor 190 as the received signal in parallel with the carrier or threshhold detection circuit 310.

Figure 10:
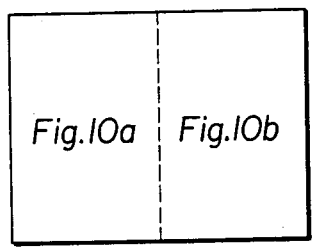
FIGS. 10a-b are detailed schematics of one of the solid state electronic cross connect.

Shown in FIG. 10 is the solid state electronic cross connect. One solid state electronic cross connect 44 is used for each 50 input lines 350 serviced by a single COM card twisted pair 358. Only one of the 50 may be selected at anytime.

The particular cross connect 44 to be achieved is transmitted in three serial bytes shown in FIG. 14d by the CEM card 38 through the RS485 address input 360 to the solid state electronic cross connect decoder/controller 364. The addressing bytes include the cross connect address 370, the subscriber address 372 and a check sum 378. The cross connect address is checked with the use of a 8 pole dip switch 390. The scanner 364 uses the subscriber address 372 to cause the proper interconnection of the output 358 of the COM card 40 to one of fifty tip and ring terminals 350 in the MDF interface, as also shown in FIG. 1.

As shown in FIG. 10, the 50 pair inputs are cross connected to one output pair by the seven by eight LED matrix 402. The on board 6805 microprocessor 364 decodes the subscriber 372 address to its corresponding row and column. By enabling the appropriate ports, the microprocessor 364 turns on the proper optically coupled Theta-J relay 408 by sourcing its LED through the row port and sinking the current into the column port.

Figure 12:
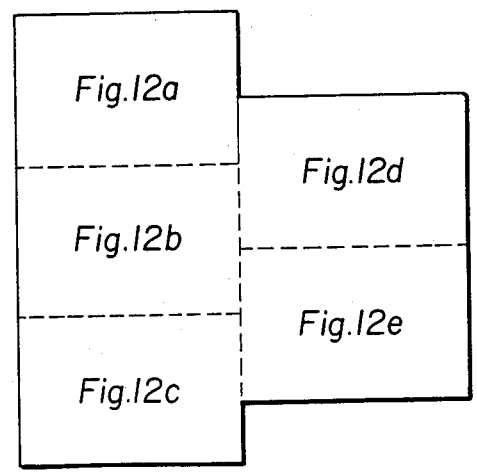
FIGS. 12 and 12a-e are schematic diagrams of the remote terminal unit.
Figure 11:
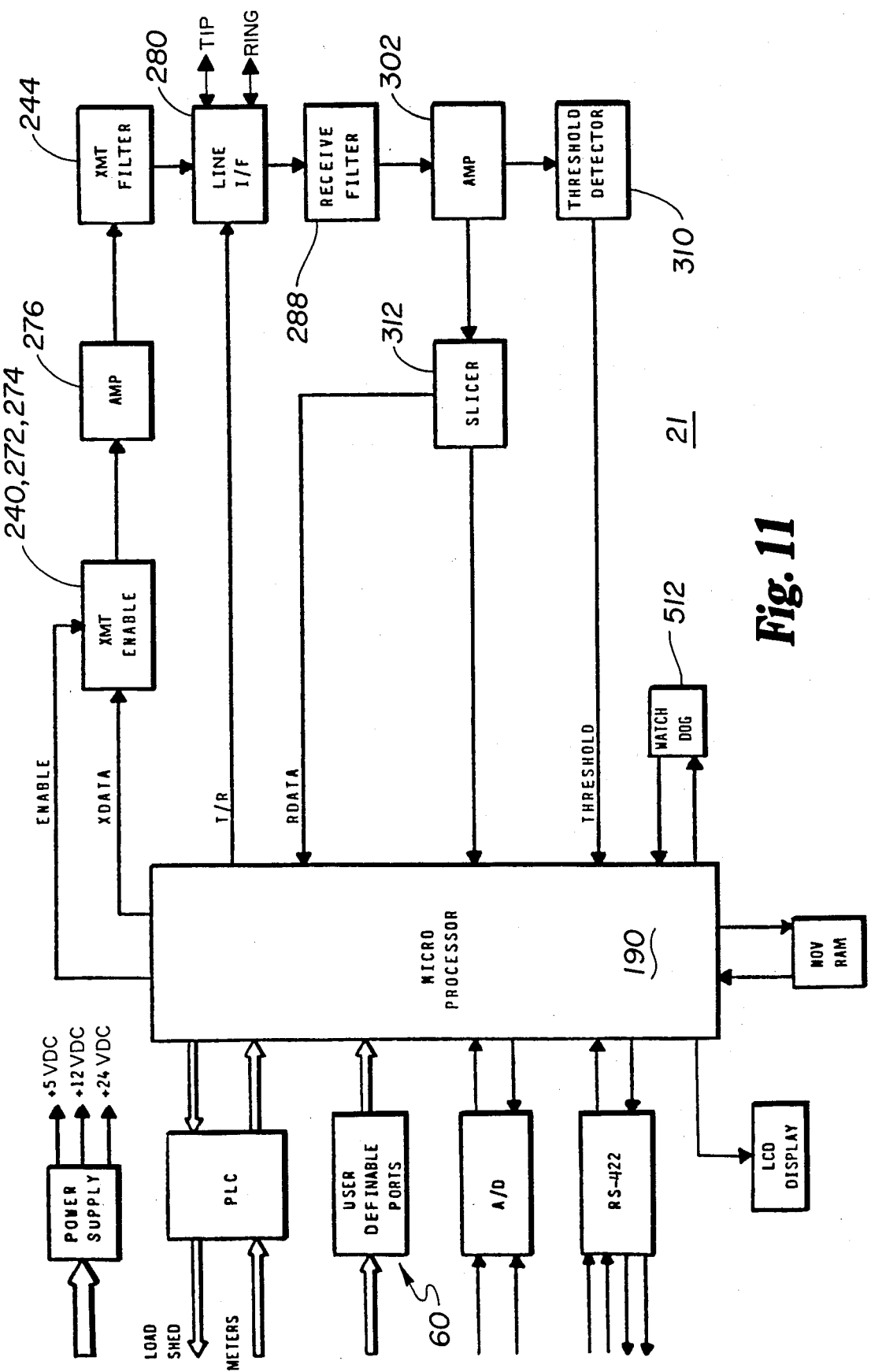
FIG. 11 is a block diagram of a remote terminal unit.
Figure 12A:
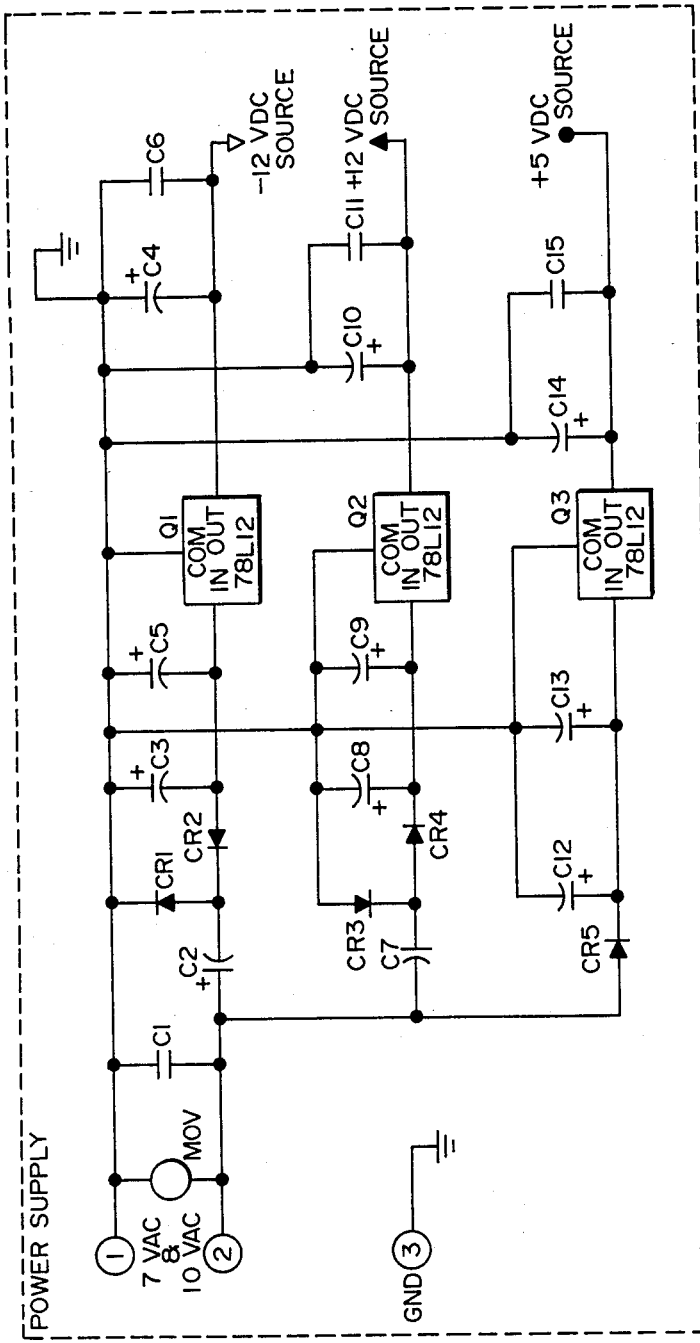
Figure 12B:
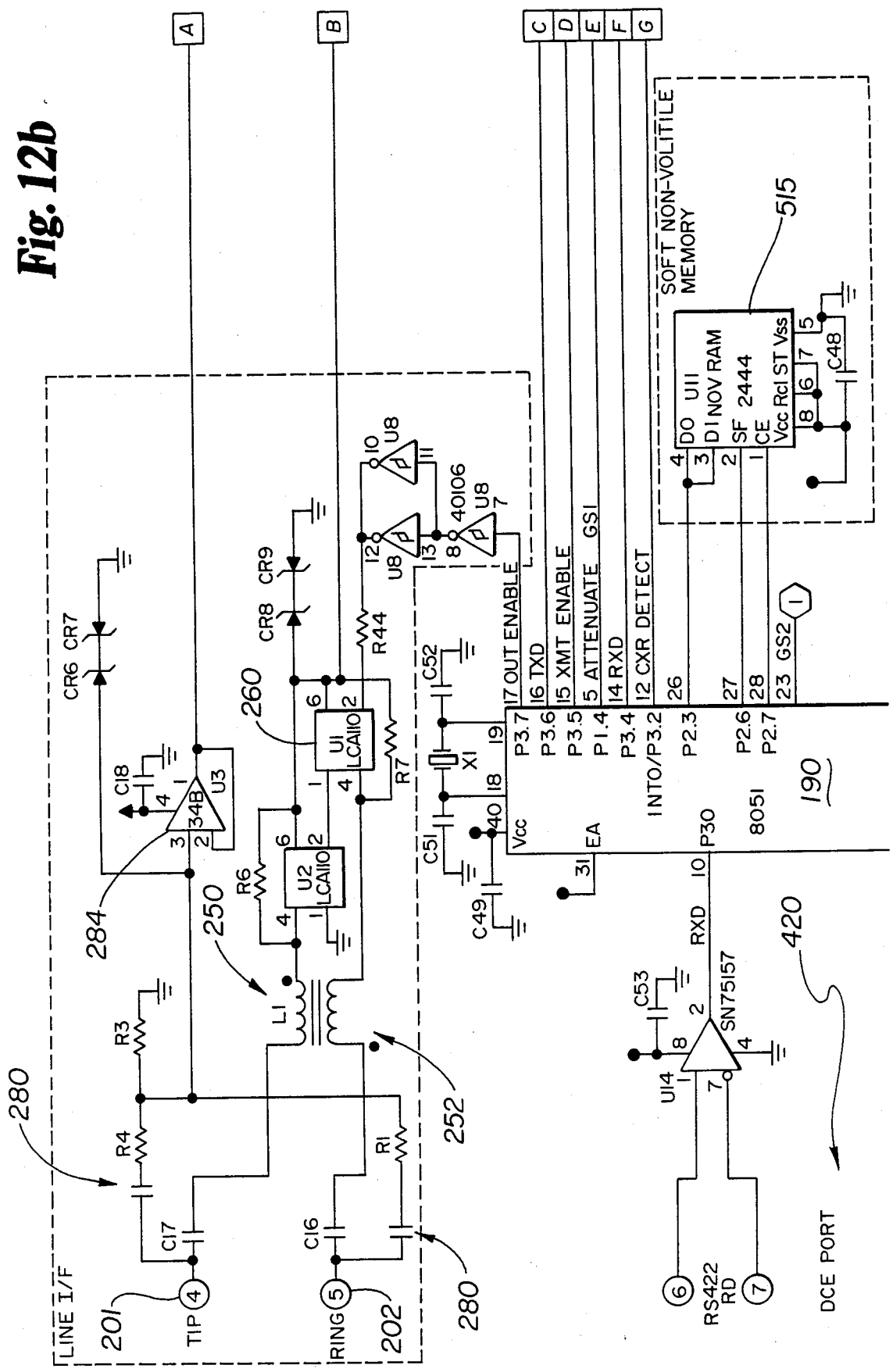
Figure 12C:
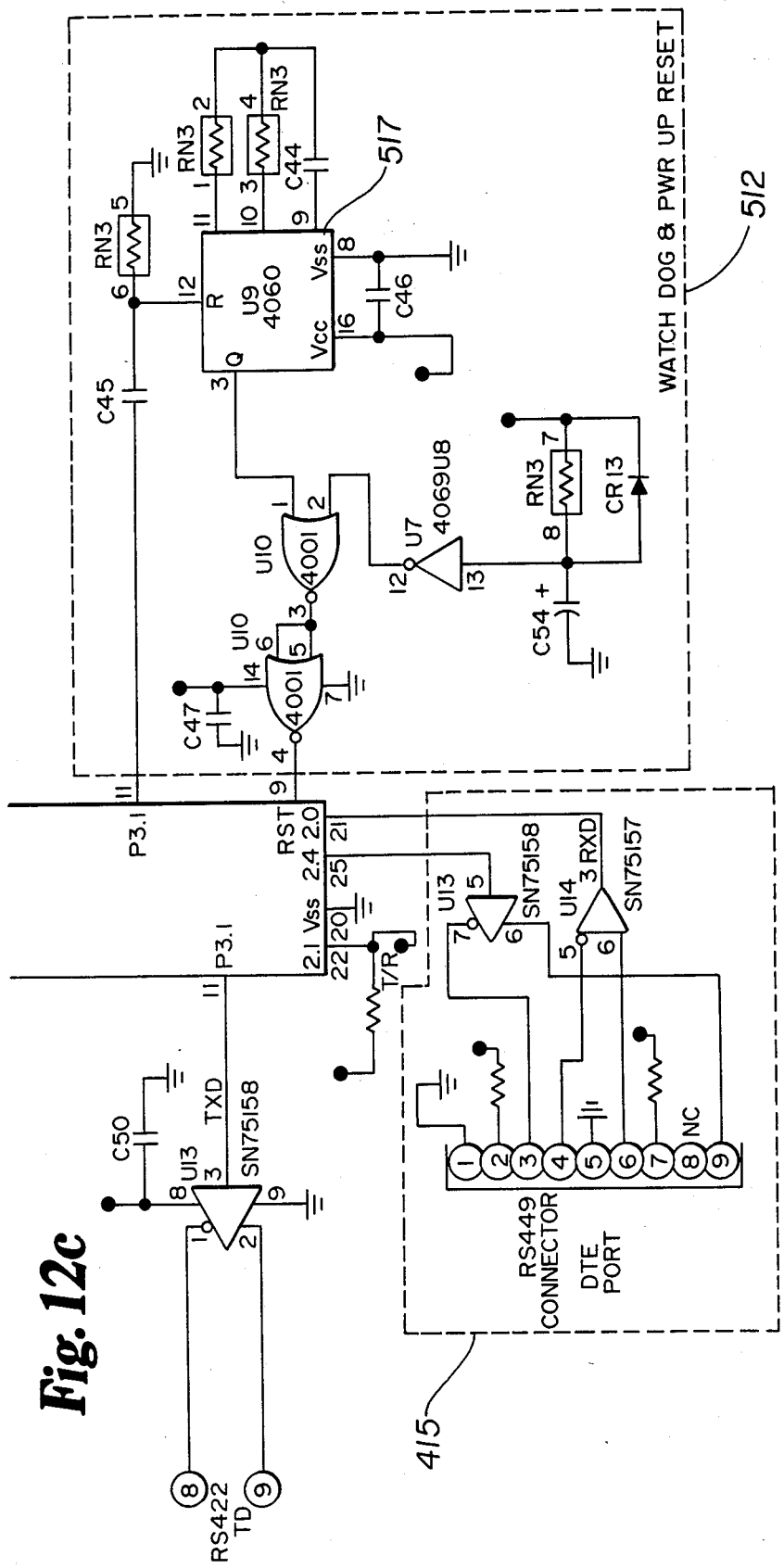
Figure 12D:
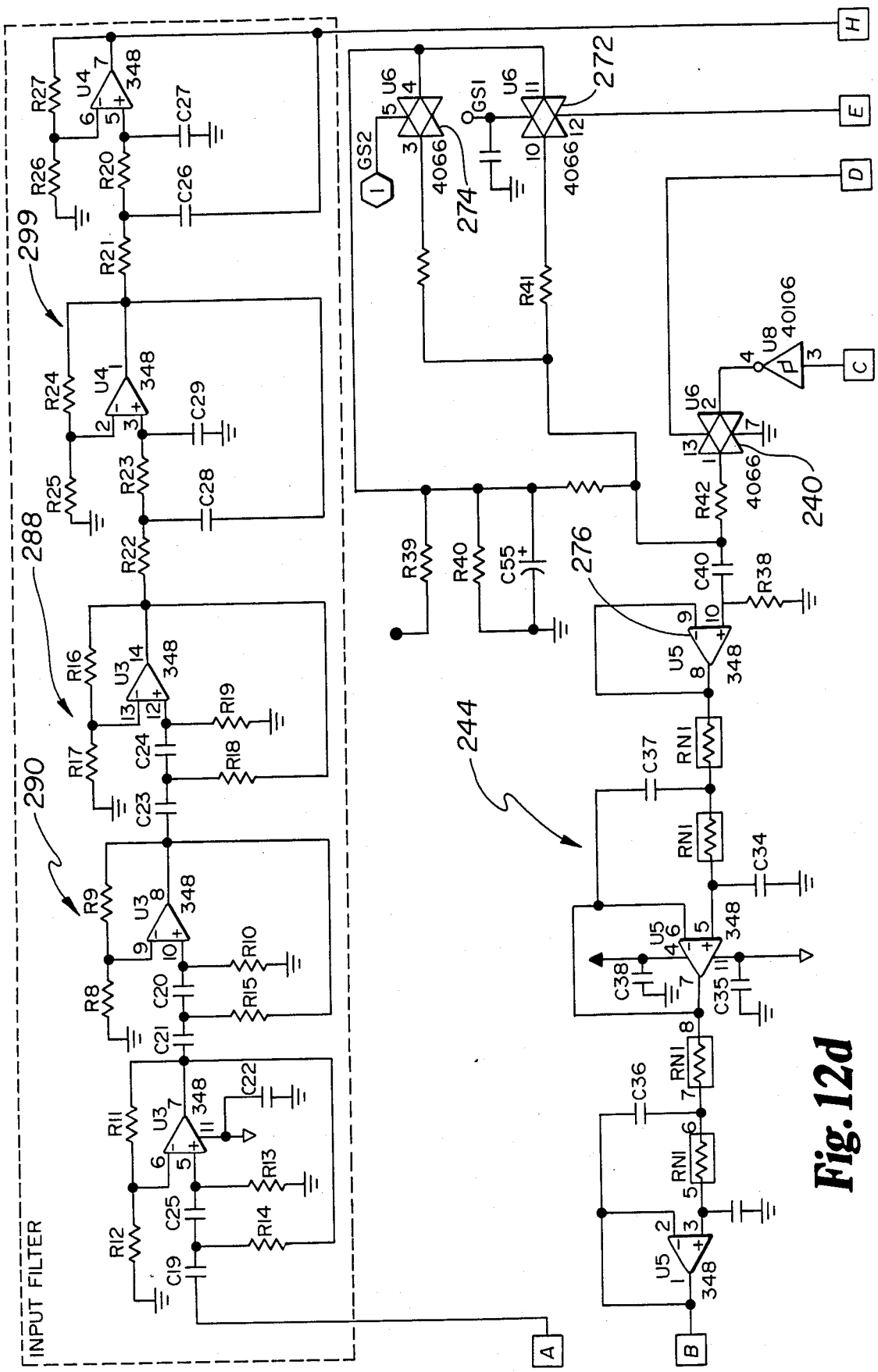
Figure 12E:
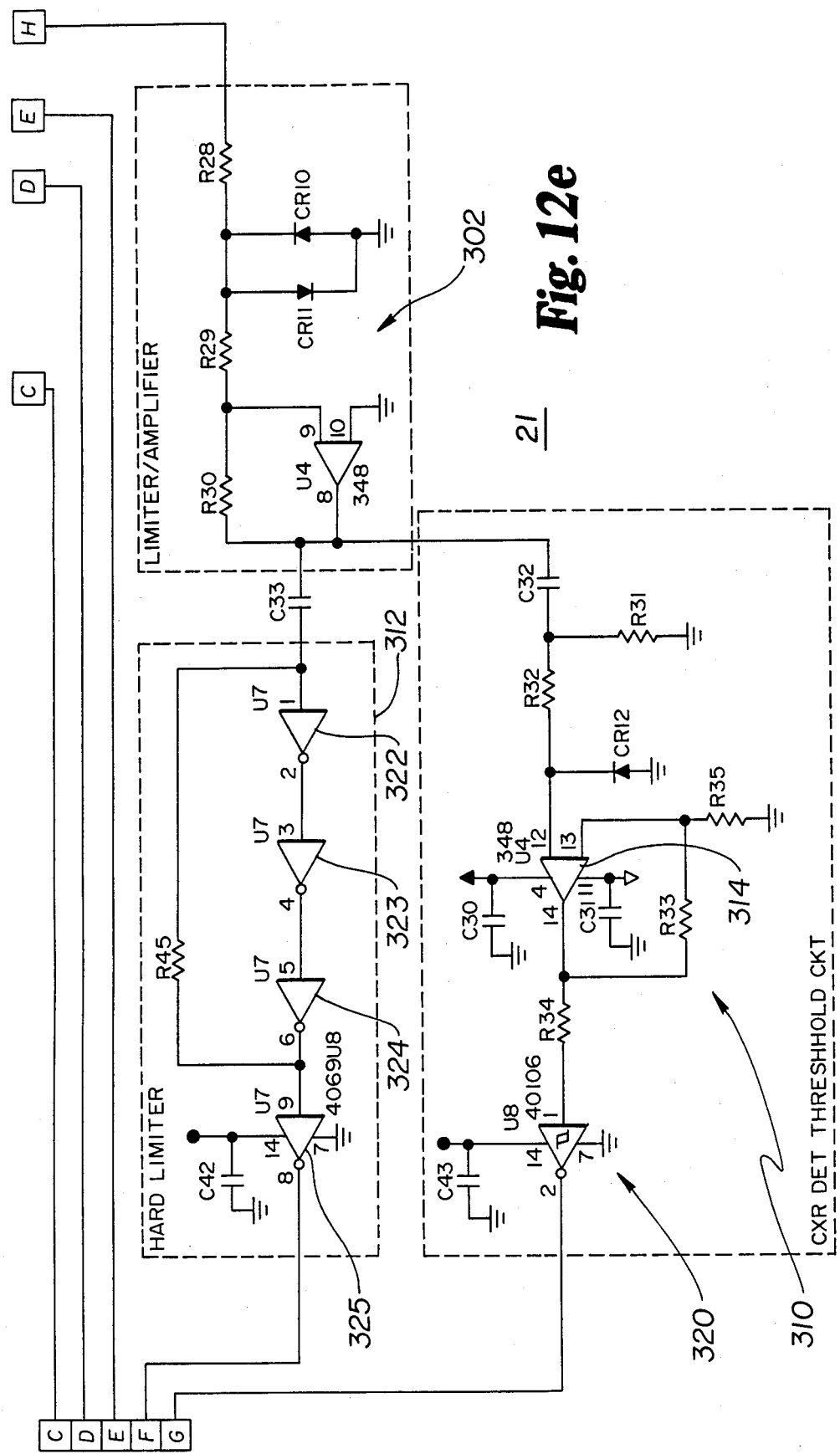

Referring now to FIGS. 11 and 12, one of the 10,000 remote terminal units 21 are shown. As can be seen by comparing FIGS. 9 and 12, each of the remote terminal units 21 are substantially identical to the central office modules 40 with the exception of the output and one input to the 8051 microprocessor 190. The eight bit data which is output from the RTU 21 is connected through the DTE port 415 which are user definable ports including power line carrier ports.

Also connected as an input to the 8051 microprocessor 190 is a DCE port 420 with RS422 interfaces. This port can be used to receive and transmit data with integrated digital network systems (IDNS) format.

Note that the design of the COM cards 40 and the RTU's 21 are such that a similar circuit can be connected on the power line of the subscriber residence to function as a power line carrier (PLC).

In addition to the receive and transmission circuitry of the remote terminal unit 21, the remote terminal also preferably utilizes a reset "watch-dog" circuit 512 which detects errors in transmission in receipt of data to reset the microprocessor 190 as well as a nonvolatile RAM 515 to store pertinant data in case of power loss to the microprocessor 190 and which can be used to individualize the remote terminal units 21 according to the purposes of the remote subscriber.

The watch dog circuit consists of a binary ripple counter 517 which is clocked by the microprocessor 190. The microprocessor 190 outputs intermittent pulses which reset the counter before it reaches its count. If the microprocessor 190 were to "hang up" for any reason, the counter reaches its count, the output goes high and the microprocessor 190 is reset.

As explained in detail above, data 74 can be transmitted and received longitudinally on the line for whatever purposes a utility or other service agency wishes to communicate that data to the user/subscriber.

Because of the longitudinal transmission the data transmission will be rejected by the voice analog circuit by common mode rejection and the voice analog or other analog information or any data information which is transmitted at different baud rates or in different formats will not be detected by the remote terminal units 21 and COM card 40 of the invention.

Having described the means and method of communicating data from a utility or other service agency to each of 10,000 subscribers on an exchange and the means and method of receiving data from those remote subscribers, it will be obvious to those skilled in the art that many and varied changes can be made to the telemetry system and still achieve the objectives and advantages of the method and means disclosed. All such modifications and variations are within the contemplation of the claims.

Having described our invention, we claim:

1. A data telemetry system for transmitting data over telephone lines to subscribers on a telephone exchange, each subscriber having a unique address, comprising:
    controlling means for addressing each of a number of subscribers according to their unique addresses;
    multiplexing means for establishing data paths to each of the subscribers;
    a plurality of transmitting means for encoding the data for common mode longitudinal transmission on the telephone line to selected groups of subscribers;
    connecting means for connecting each of the plurality of transmitting means to one of a plurality of telephone lines; and
    receiving means at each subscriber location for receiving the data addressed to the subscriber.

2. A central switching unit for use in a data telemetry system which transmits data over telephone lines to subscribers connected to a telephone exchange, each subscriber having a unique address, comprising:
    a plurality of data transmission modules each module having means for encrypting the data for longitudinal transmission over a separate telephone subscriber loop for each addressed subscriber; and
    a controller circuit for selecting one of the plurality of modules for transmission according to the address of the subscriber to whom data is to be addressed.

3. A multiplexer for use in an integrated digital data serivce wherein data is to be longitudinally transmitted by one of a plurality of encoding modules to a subscriber having a unique address, the multiplexer comprising:
    means for receiving the address of the subscriber and the data to be transmitted to the subscriber;
    means for selecting one of the plurality of encoding modules for longitudinally transmitting the data;
    means for addressing the subscriber to transmit the data;
    means for checking the status of the module to transmit the data; and
    means for routing data to the module for common mode transmission and receiving data from the module.

4. A data transmission module for use in an integrated digital data service wherein a plurality of modules are used to transmit data over a pair of transmission lines, the data transmission module comprising:
    means for receiving the data to be transmitted;
    means for block encoding the data for forward error correction;
    means for interleaving bits of the data to be transmitted;
    means for modulating the data with a pseudo random code for transmitting the data in a spread spectrum direct sequence;
    means for combining the spread spectrum sequence with a carrier frequency to produce tri-phase modulation of the data when transmitted; and
    means for longitudinally transmitting the data in common mode over the pair of transmission lines.

5. A remote terminal unit for use in a integrated digital services telemetry system for receiving packetized data transmitted with a carrier from a central office over a telephone line comprising:
    means for receiving a common mode longitudinal transmission of data over the telephone line from a central office;
    means for filtering the received data;
    means for amplifying the received data;
    means for detecting the carrier; and
    means for decoding the data.

6. The apparatus of any of claims 1–4 or 5 wherein the data transmitted includes a polling instruction for data generated by the subscriber and wherein the apparatus further comprises means for transmitting data generated by the subscriber and the address of the subscriber to the central office.

7. The apparatus of claim 4 wherein the pair of transmission lines are telephone lines and data is transmitted from a central office to a remote subscriber having a unique address.

8. The remote terminal of claim 5 wherein the remote terminal unit is provided to subscribers having premises each subscriber also having power lines throughout the subscriber premises and wherein the remote terminal unit further comprises means for connecting the received data to the subscriber's power lines, the connecting means comprising a power line carrier transceiver.

9. A solid state cross connect for connecting one of a plurality of telephone lines to a data module for transmission of data to a telephone subscriber having a unique address, comprising:
    processing means for receiving the address of the subscriber to be accessed;
    a plurality of solid state devices each coupled to a plurality of telephone lines and one of a plurality of transmitting modules, each module comprising;
    means for receiving the data to be transmitted;
    means for block encoding the data for forward error correction;
    means for interleaving bits of the data to be transmitted;
    means for modulating the data with a pseudo-random code for transmitting the data in a spread spectrum direct sequence;
    means for combining the spread spectrum sequence with a carrier frequency to produce tri-phase modulation of the data when transmitted; and
    means for longitudinally transmitting the data in common mode over the telephone lines; and
    means for selecting one of the plurality of telephone lines to connect to the transmission module according to the address received by the processing means.

10. A data transmission system for use in an integrated digital data service wherein modules are used to transmit data from and to a central location to and from peripheral equipment located on remote premises, each remote premise having a unique address and being connected to the central location by a telephone line and each piece of peripheral equipment having a unique identification and being connected to a power line, the data transmission system comprising:
    means for receiving the data to be transmitted;
    means for block encoding the data for forward error correction;
    means for interleaving bits of data to be transmitted;
    means for modulating the data with a pseudo-random code for transmitting the data in a spread spectrum direct sequence;

means for combining the spread spectrum sequence with a carrier frequency to provide tri-phase modulation of the data when transmitted;

means for longitudinally transmitting the data in common mode over the telephone line;

means for receiving the longitudinally transmitted data;

means for connecting the received data to the power line, said means comprising a power line carrier;

means at each identified piece of peripheral equipment for receiving the data transmitted on the power line; and means for decoding the data at each identified piece of peripheral equipment.

11. The transmission system of claim 10 wherein:

the means for receiving data transmitted over the power lines further comprises means for transmitting data from each identified piece of peripheral equipment over the power line;

the means for receiving data transmitted over the telephone lines further comprises means for receiving data transmitted over the power lines and means for longitudinally transmitting the data in common mode over the telephone lines; and the means for receiving the data to be transmitted comprises means for receiving and decoding data longitudinally transmitted in common mode over the telephone lines so that data can be transmitted from and to the central location to and from each piece of identified peripheral equipment.

12. A remote terminal unit for use in an integrated digital services telemetry system for transmitting data from a remote location to a central location over a pair of telephone lines comprising:

means for receiving the data to be transmitted;

means for block encoding the data for forward error correction;

means for interleaving bits of the data to be transmitted;

means for modulating the data with a pseudo-random code for transmitting the data in a spread spectrum direct sequence;

means for combining the spread spectrum sequence with a carrier frequency to produce tri-phase modulation of the data when transmitted; and means for longitudinally transmitting the data in common mode over the telephone lines to the central location.

13. A method for transmitting data over telephone lines to subscribers on a telephone exchange, each subscriber having a unique address, comprising:

addressing each subscriber according to its unique address;

establishing a data path to each subscriber;

receiving the data to be transmitted;

block encoding the data for forward error correction;

interleaving bits of the data to be transmitted;

modulating the data with a pseudo-random code for transmitting the data in a spread spectrum direct sequence;

combining the spread spectrum sequence with a carrier frequency to produce tri-phase modulation of the data when transmitted; and longitudinally transmitting the data in common mode over the telephone lines.

14. A method for transmitting data over telephone lines from a remote subscriber to a telephone exchange:

receiving the data to be transmitted;

block encoding the data for forward error correction;

interleaving bits of the data to be transmitted;

modulating the data with a pseudo-random code for transmitting the data in a spread spectrum direct sequence;

combining the spread spectrum sequence with a carrier frequency to produce tri-phase modulation of the data when transmitted; and longitudinally transmitting the data in common mode over the telephone lines.

* * * * *